(12) United States Patent
Kim

(10) Patent No.: US 9,975,445 B2
(45) Date of Patent: May 22, 2018

(54) VEHICLE, VEHICLE CONTROL SYSTEM, DISPLAY APPARATUS FOR VEHICLE, TERMINAL APPARATUS AND CONTROL METHOD FOR THE VEHICLE

(71) Applicant: HYUNDAI MOTOR COMPANY, Seoul (KR)

(72) Inventor: Hyun Soo Kim, Goyang-si (KR)

(73) Assignee: Hyundai Motor Company, Seoul (KR)

( * ) Notice: Subject to any disclaimer, the term of this patent is extended or adjusted under 35 U.S.C. 154(b) by 62 days.

(21) Appl. No.: 15/240,811

(22) Filed: Aug. 18, 2016

(65) Prior Publication Data

US 2017/0274790 A1    Sep. 28, 2017

(30) Foreign Application Priority Data

Mar. 22, 2016    (KR) .................. 10-2016-0033929

(51) Int. Cl.
  *B60L 11/18*    (2006.01)
  *B60L 1/00*    (2006.01)

(52) U.S. Cl.
  CPC ............ *B60L 11/1838* (2013.01); *B60L 1/00* (2013.01); *B60L 11/1844* (2013.01); *B60L 2230/40* (2013.01); *B60L 2250/00* (2013.01)

(58) Field of Classification Search
  CPC .... B60L 11/1838; B60L 1/00; B60L 11/1844; B60L 2250/00; B60L 2230/40
  USPC ....................................................... 320/109
  See application file for complete search history.

(56) References Cited

U.S. PATENT DOCUMENTS

| 7,974,747 B2 * | 7/2011 | Muta | B60W 20/10 |
| | | | 701/111 |
| 9,260,110 B2 * | 2/2016 | Tamura et al. | B60W 10/04 |

FOREIGN PATENT DOCUMENTS

| JP | 2007-227321 A | 9/2007 |
| JP | 2008-065816 A | 3/2008 |
| JP | 2012173144 | 9/2012 |
| JP | 2013-009539 A | 1/2013 |
| JP | 5318920 | 7/2013 |
| JP | 2013-183488 A | 9/2013 |
| JP | 5488418 | 3/2014 |
| KR | 10-2012-0037828 | 4/2012 |

* cited by examiner

*Primary Examiner* — Sun Lin

(74) *Attorney, Agent, or Firm* — Brinks Gilson & Lione

(57) ABSTRACT

Forms of the disclosure relate to a vehicle, a vehicle control system, a display apparatus for vehicle, a terminal apparatus and a control method of the vehicle. The control method of a vehicle comprises receiving an input of a charge request period after the vehicle is electrically connected to an external power source, determining a power distribution rate of a rechargeable battery and at least one of peripheral device based on the charge request period, displaying the power distribution rate, receiving an input of an adjustment command related to the power distribution rate and distributing and supplying a power, which is supplied to the vehicle, to at least one of the rechargeable battery or the at least one peripheral device, according to a power distribution rate that is adjusted based on the adjustment command.

20 Claims, 19 Drawing Sheets

FIG. 6

| | RECHARGEABLE BATTERY | FIRST PERIPHERAL DEVICE | SECOND PERIPHERAL DEVICE | THIRD PERIPHERAL DEVICE | ... |
|---|---|---|---|---|---|
| RECHARGEABLE BATTERY CHARGE EXCLUSIVE MODE | 100% | 0% | 0% | 0% | ... |
| MULTI-DEVICE CHARGE MODE | X | Y1 | Y2 | Y3 | |

$$Z = X + \sum_{i}^{N} Y_i = 100\%$$

VEHICLE, VEHICLE CONTROL SYSTEM, DISPLAY APPARATUS FOR VEHICLE, TERMINAL APPARATUS AND CONTROL METHOD FOR THE VEHICLE

CROSS-REFERENCE TO RELATED APPLICATION(S)

The present application claims the benefit of Korean Patent Application No. 10-2016-0033929, filed on Mar. 22, 2016 in the Korean Intellectual Property Office, the entire disclosure of which is incorporated herein by reference.

BACKGROUND

1. Field

Forms of the present disclosure relate to a vehicle, a vehicle control system, a display apparatus for vehicle, a terminal apparatus and a control method of the vehicle.

2. Description of Related Art

A vehicle may represent a variety of apparatuses configured to transport an object, such as people, animals, plants, or goods, from the departure point to the destination. The vehicle may be capable of transporting the object to the destination while moving in a variety of direction by using one and more wheels installed in the body of the vehicle. The vehicle may include three-wheeled or four-wheeled vehicle, a two-wheeled vehicle such as a motorcycle, construction equipment, a cycle or a train traveling on the rails disposed on the line.

A vehicle typically drives on the road or the railroad by using power that is acquired in a way that a thermal energy acquired by burning fossil such as gasoline and diesel by using an engine is converted into a mechanical energy. However, more recently, a vehicle may obtain power by using an electric energy that is charged in a battery inside of the vehicle other than the burning of the fossil. The vehicle acquiring power from the electric energy may be referred to as "Electric vehicle".

The electric vehicle may include an Electric vehicle (EV) configured to obtain power from an electric energy, a Hybrid Electric Vehicle (HEV) configured to obtain power from both of an electric energy and a thermal energy through the burning of the fossil, and a Plug-in Hybrid Electric Vehicle (PHEV) configured to charge a rechargeable battery that is embedded by receiving an electric energy from the outside while using power from both of an electric energy and a thermal energy through the burning of the fossil an electric energy.

SUMMARY

Therefore, it is an aspect of the present disclosure to provide a vehicle, a vehicle control system, a display apparatus for vehicle, a terminal apparatus and a control method of the vehicle, capable of performing a charge efficiently according to user's requirement by allowing a user to easily, quickly, and conveniently adjust charging a rechargeable battery.

It is another aspect of the present disclosure to provide a vehicle, a vehicle control system, a display apparatus for vehicle, a terminal apparatus and a control method of the vehicle, capable of automatically and properly distributing a power distribution rate of a rechargeable battery of a vehicle and peripheral devices of a vehicle during a desired charge request period while allowing a user to easily and quickly adjust a power distribution rate as needed.

Additional aspects of the present disclosure will be set forth in part in the description which follows and, in part, will be obvious from the description, or may be learned by practice of the present disclosure.

A vehicle control system may comprises a terminal apparatus configured to receive an input of a charge request period and to receive an adjustment command related to a power distribution rate determined by the charge request period and a vehicle configured to distribute and supply a power, which is supplied externally from the vehicle, to at least one of an embedded rechargeable battery and at least one peripheral device, according to a power distribution rate that is adjusted based on the adjustment command.

At least one of the terminal apparatus and the vehicle may determine the power distribution rate according to the charge request period.

The adjustment command may comprise at least one of a reduction command and an increase command related to at least one of the power distribution rate of the rechargeable battery and the power distribution rate of the at least one peripheral device.

The terminal apparatus may be configured to receive at least one of a reduction command and an increase command related to the power distribution rate of the at least one peripheral device, after the reduction command relate to the power distribution rate of the rechargeable battery is input.

At least one of the terminal apparatus and the vehicle may be configured to automatically increase a power distribution rate of the at least one peripheral device when the adjustment command relates to the power distribution rate is the reduction command related to the power distribution rate of the rechargeable battery.

At least one of the terminal apparatus and the vehicle may be configured to automatically increase a power distribution rate of each peripheral device of the at least one peripheral devices by increasing a power distribution rate of each of the plurality of peripheral devices equally, or by increasing a power distribution rate of each peripheral device of the at least one peripheral devices based on a different weighted value, when the at least one peripheral device is a plurality of peripheral devices.

At least one of the terminal apparatus and the vehicle may be configured to determine the power distribution rate to allow the rechargeable battery to be fully charged during the charge request period.

At least one of the terminal apparatus and the vehicle may be configured to determine the power distribution rate to allow the power to be exclusively supplied to the rechargeable battery when it is determined that the rechargeable battery is not fully charged during the charge request period.

The terminal apparatus may be configured to receive an input of an increase command of the power distribution rate of the at least one peripheral device, only when the reduction command of the power distribution rate of the rechargeable battery is input.

At least one of the terminal apparatus and the vehicle may be configured to calculate at least one expected amount of charge of the rechargeable battery and the at least one of peripheral devices based on the power distribution rate.

The terminal apparatus may be configured to receive an input of the reduction command related to the power distribution rate of the rechargeable battery when the expected amount of charge of the rechargeable battery is maximum.

The terminal apparatus may be configured to receive an input of selecting any one of a rechargeable battery charge exclusive mode and a plurality of devices charge mode.

The vehicle may be configured to supply the power to the rechargeable battery exclusively when the rechargeable battery charge exclusive mode is selected.

The vehicle may be configured to select the plurality of devices charge mode according to a pre-determined setting or a user's manipulation using the terminal apparatus when the rechargeable battery is fully charged.

The terminal apparatus may be configured to receive an input of a charge request period when the plurality of devices charge mode is selected.

The at least one peripheral device may comprise at least one of a wireless charger and a wired charger.

The vehicle control system may further comprise a server device configured to calculate the power distribution rate according to the charge request period.

A terminal apparatus configured to be communicable with a vehicle may comprises a user interface configured to display a power distribution rate of each of a rechargeable battery and at least one peripheral device that is determined based on a charge request period and configured to receive an input of an adjustment command related to the power distribution rate from a user and a communicator configured to transmit the adjustment command or a power distribution rate that is adjusted based on the adjustment command to a vehicle.

The communicator may be further configured to transmit the adjustment command or a power distribution rate that is adjusted based on the adjustment command to a controller of the vehicle, so that a power supplied to the vehicle to be distributed and supplied to at least one of the rechargeable battery and the at least one adjacent device of the vehicle.

A vehicle may comprise a power input unit to which a power is input from a source external to the vehicle, a rechargeable battery electrically connected to the power input unit, at least one peripheral device electrically connected to at least one of the power input unit or the rechargeable battery and a controller configured to distribute and supply a power, which is input via the power input unit, to at least one of the rechargeable battery or at least one peripheral device based on a first power distribution rate of the rechargeable battery and the at least one peripheral device that is determined based on a charge request period, or a second power distribution rate that is obtained by adjusting the power distribution rate according to an adjustment command.

BRIEF DESCRIPTION OF THE DRAWINGS

These and/or other aspects of the disclosure will become apparent and more readily appreciated from the following description of embodiments, taken in conjunction with the accompanying drawings of which:

FIG. 6 is a table illustrating an example of a charge distribution.

DETAILED DESCRIPTION

Reference will now be made in detail to forms of the present disclosure, examples of which are illustrated in the accompanying drawings.

Hereinafter, a vehicle control system, a vehicle, a terminal apparatus, a server device, and a display apparatus for vehicle in accordance with a form of the present disclosure will be described with reference to FIGS. 1 to 17.

Figure 1:
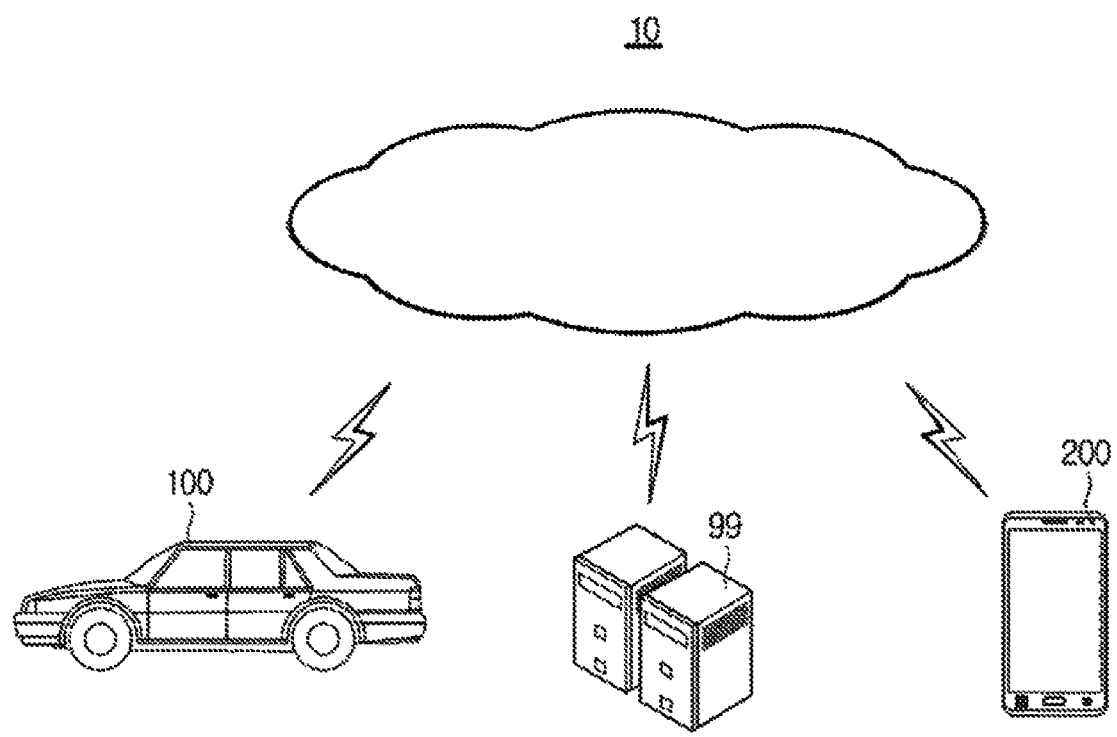
FIG. 1 is a view illustrating a vehicle control system.

FIG. 1 is a view illustrating a vehicle control system.

Referring to FIG. 1, a vehicle control system 10 may include a vehicle 100 and a terminal apparatus 200 configured to be communicable with the vehicle 100 via at least one of a wired communication network and a wireless communication network.

The wireless communication network may be implemented by a local area network technology and at least one of mobile network technology. The local area network technology may include at least one of wireless LAN, Wi-Fi, Bluetooth, ZigBee, CAN communication system, Wi-Fi Direct, ultra-wideband communication system, IrDA, infrared Data Association, Bluetooth Low Energy, and Near Field Communication (NFC). The mobile communication technology may include at least one of wireless communication technology that is implemented by using a variety of mobile communication stands, e.g., 3GPP-based communication system, 3GPP2-based communication system, or Wi MAX-based communication system.

The wired communication network may be implemented by using a cable, e.g., a pair cable, a coaxial cable, an optical fiber cable or an Ethernet cable.

The vehicle 100 may include a vehicle (hereinafter referred to as "electric vehicle") configured to obtain power in a way of receiving electric power from the outside, storing the received electric power, and then using the stored electric energy. The electric vehicle may include plug-in hybrid electric vehicle as well as a conventional electric vehicle. In addition, a variety of electric vehicle configured to receive electric power from the outside and store the received electric power may be an example of the vehicle 100.

The terminal apparatus 200 may receive a variety of information from the vehicle 100 and provide the information to a user in a visual and/or acoustic manner. In addition, the terminal apparatus 200 may receive an input of various commands via a user's operation, generate a control signal and/or a variety of information according to the input command, and transmit the generated control signal and/or variety of information to the vehicle 100.

The terminal apparatus 200 may include a desktop computer, a portable computer, e.g., a laptop computer, a smart phone, a tablet PC, a cellular phone, a portable game machine, a Personal Digital Assistant (PDA), an electronic organizer, or a navigation device, but is not limited thereto. The terminal apparatus 200 may include various kinds of devices capable of communicating with the vehicle 100.

In some forms, the vehicle control system 10 may further include a server device 99.

The server device 99 may be communicably connected to the vehicle 100 and the terminal apparatus 200 via at least one of the wired communication network and the wireless communication network. The server device 99 may receive a variety of control commands or information transmitted from the vehicle 100 and transmit the received control commands or information to the terminal apparatus 200, or generate a new control command or information according to the received control command or information and transmit the generated control command or information to the terminal apparatus 200. In contrast, the server device 99 may receive a variety of control commands or information transmitted from the terminal apparatus 200 and transmit the received control commands or information to the vehicle 100, or generate a new control command or information according to the received control command or information and transmit the generated control command or information to the vehicle 100.

The server device 99 may be implemented by using one or more computer device, and the computer device may be particularly configured for an operation of the server device 99.

Hereinafter a server device and a terminal apparatus will be described in details.

Figure 2:
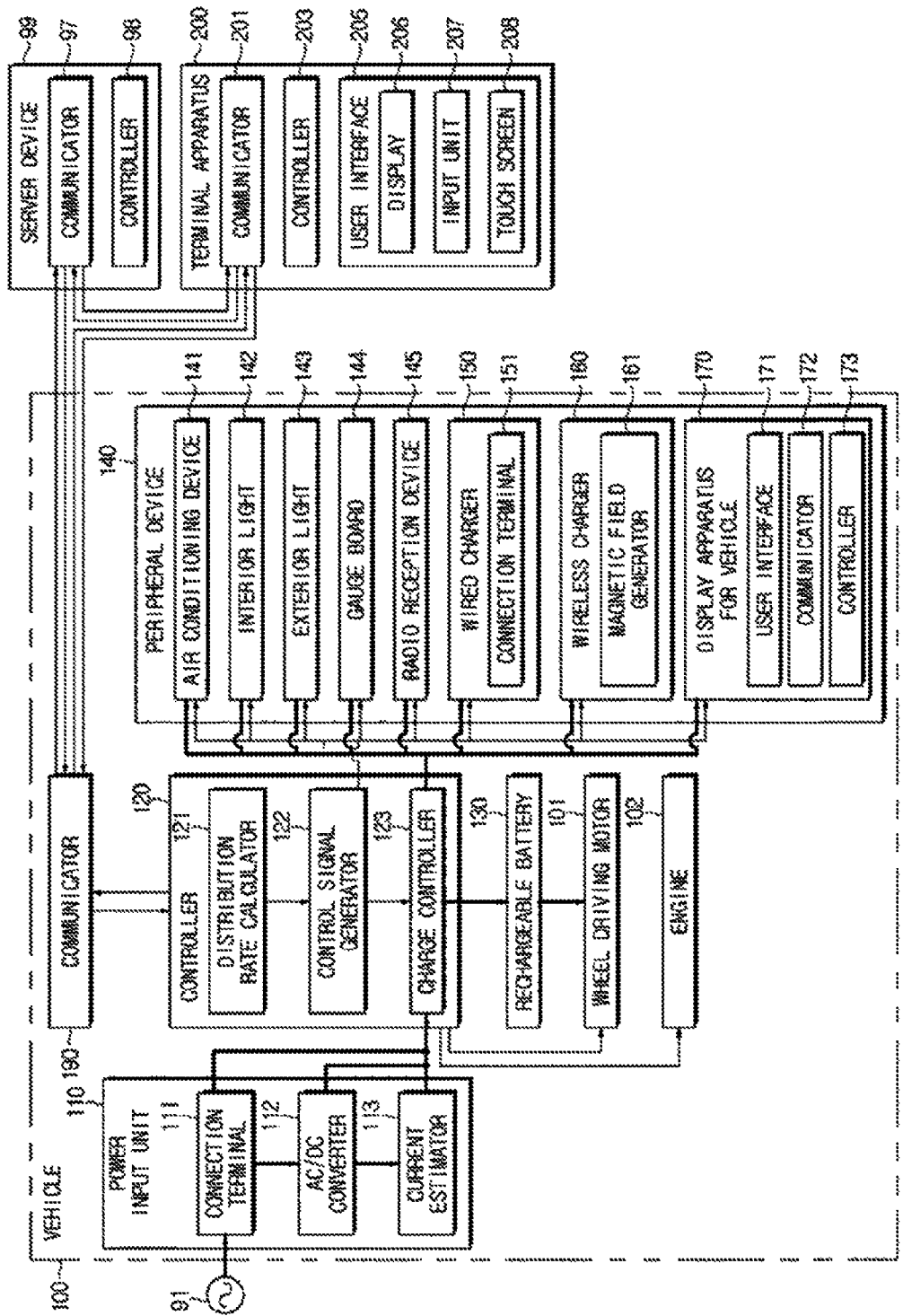
FIG. 2 is control block diagram illustrating a vehicle, a server device and a terminal apparatus.
Figure 3:
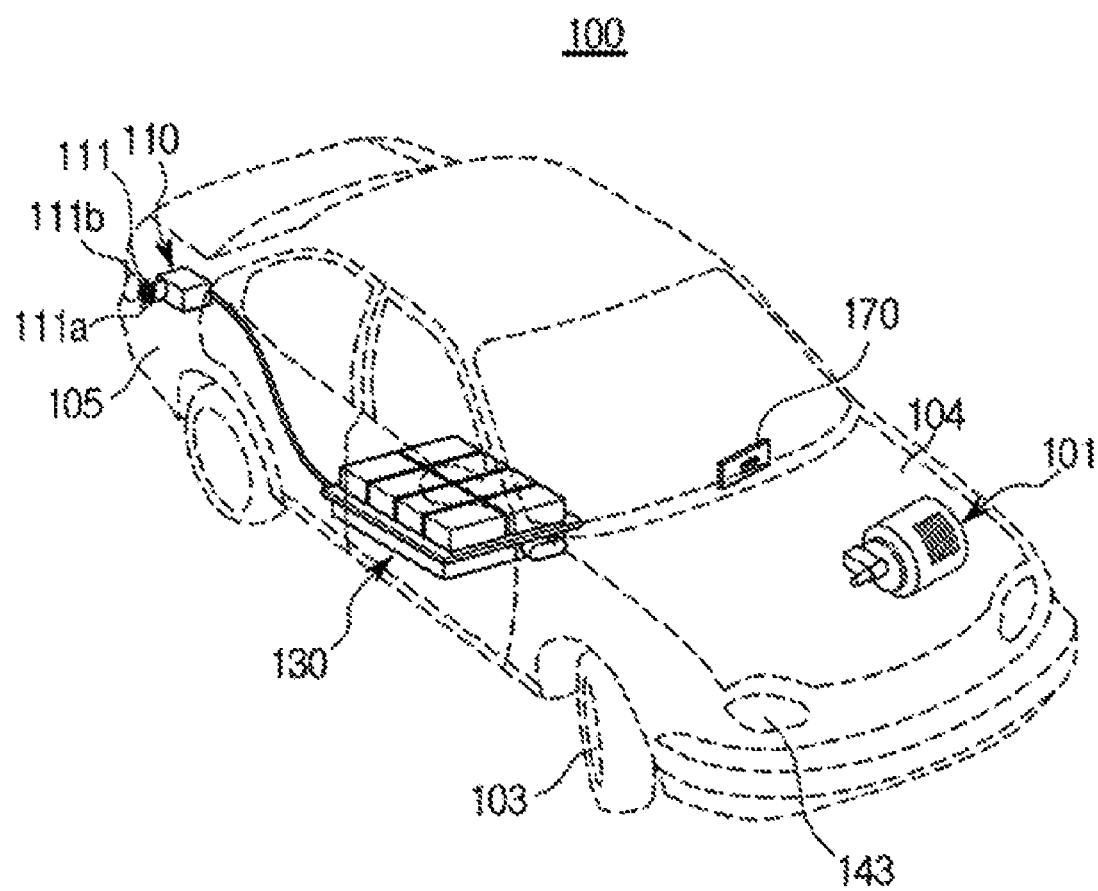
FIG. 3 is a view illustrating a vehicle.

FIG. 2 is control block diagram illustrating a vehicle, a server device and a terminal apparatus. FIG. 3 is a view illustrating a vehicle.

Hereinafter a vehicle 100 will be described.

As illustrated in FIG. 2, the vehicle 100 may include a wheel driving motor 101, a power input unit 110, a controller 120, a rechargeable battery 130 and an peripheral device 140. As needed, the vehicle 100 may further include at least one of an engine 102 and a communicator 190.

The wheel driving motor 101 may be provided to apply a driving force to a wheel 103 provided in the vehicle 100 according to a control of the engine 102. The wheel driving motor 101 may receive electric power from the rechargeable battery 130 to be driven according to the received electric power thereby transmitting a torque to the wheel 103. As illustrated in FIG. 3, the wheel driving motor 101 may be provided in the inside of a front portion 104 of the vehicle 100, but is not limited thereto. According to a designer's selection, the wheel driving motor 101 may be installed in various locations inside of the vehicle 100.

The engine 102 may obtain power by burning fossil such as a gasoline or a diesel, and transmit the obtained power to the wheel 103 thereby rotating the wheel 103. When the vehicle 100 is a hybrid electric vehicle or a plug-in hybrid electric vehicle, the vehicle 100 may include both of the wheel driving motor 101 and the engine 102, and when the vehicle 100 is a conventional electric vehicle, the engine 102 may be emitted.

The power input unit 110 may receive electric power that is needed for the vehicle 100 by being connected to an external power source 91, and transmit the received electric power to a charge controller 123. Referring to FIG. 2, the power input unit 110 may include a connection terminal 111, and as needed, the power input unit 110 may further include at least one of an analog-digital converter 112 and a current estimator 113.

As illustrated in FIG. 3, the connection terminal 111 may be installed in one portion of an external surface of the vehicle 100. For example, a groove 111*a* may be formed in the external surface of the vehicle 100, a cover 111*b* configured to open and close the groove 111*a* may be formed on one wall of the groove 11*a*, and the connection terminal 111 may be installed in an inner wall of the groove 111*a* so that the connection terminal 111 may be provide to be exposed or unexposed to the outside by the cover 111*b*.

The connection terminal 111 may have a certain shape so that another connection terminal (not shown), which is formed in an end of a cable, in which electric power is transmitted from the external power source 91, to be connected thereto. The shape of the connection terminal 111 may vary according to a designer's selection or various standards. The electric power transmitted from the external power source 91 may be transmitted to the charge controller 123 of the controller 120, and may be transmitted to the charge controller 123 through at least one of the analog-digital converter 112 and the current estimator 113, as needed.

The analog-digital converter 112 may convert the electric power transmitted via the connection terminal 111 into a certain type that is used for a variety of components inside of the vehicle 100, e.g., the rechargeable battery 130 or the peripheral device 140. For example, when the electric power transmitted via the connection terminal 111 is an analog electric signal, the analog-digital converter 112 may convert the analog electrical signal into a digital electrical signal by obtaining a digital electrical signal by sampling the electrical signal with a certain period. The analog-digital converter 112 may be implemented by an on board charger (OBC). The analog-digital converter 112 may be omitted, as needed.

The current estimator 113 may estimate the size of the current supplied from the external power source 91, and transmit the result of the estimation to the controller 120. The controller 120 may calculate an expected time for a full charge that is an expected full charge time by using the size of the current, the current amount of charge of the rechargeable battery 130 or an amount of the electric power that is needed for a full charge and an amount of a current (a difference between a capacity of a battery and a current amount of charge). When the charge controller 123 is implemented by a Battery Management System (BMS), the current estimator 113 may be implemented inside of the charge controller 123. In some forms, the current estimator 113 may be omitted.

The controller 120 may be provided to control a variety of operations related to the vehicle 100. For example, the controller 120 may control an operation of an peripheral device 140 of the vehicle, e.g., an air conditioning device 141, a light 142 and 143, a gauge board 144 and/or a radio reception device 145. In some forms, the controller 120 may control an operation of a display apparatus for vehicle 170.

In addition, the controller 120 may control an operation of a variety of components installed in the inside or the outside of the vehicle 100, e.g., a wiper.

As illustrated in FIG. 2, the controller 120 may include a distribution rate calculator 121, a control signal generator 122, and a charge controller 123.

The distribution rate calculator 121 may determine how to distribute the electric power, which is supplied from the external power source 91 via the power input unit 110, into the rechargeable battery 130 and the peripheral device 140. Hereinafter a rate of electric power distributed into the rechargeable battery 130 and the peripheral device 140 may be referred to as "power distribution rate".

In some forms, the distribution rate calculator 121 may determine a power distribution rate of each of the rechargeable battery 130 and the peripheral device 140 according to a mode that is selected by a user though a user interface 171 of the display apparatus for vehicle 170 and/or a user interface 205 of the terminal apparatus 200, and transmit a result of the determination to the control signal generator 122. "Mode" may represent a group of a series task to perform a certain operation.

In some forms, a mode selected by a user may include a plurality of devices charge mode and may further include a rechargeable battery charge exclusive mode as needed. The plurality of devices charge mode may be configured to supply the electric power transmitted from the external power source 91 to the peripheral device 140 as well as the rechargeable battery 130, and the rechargeable battery charge exclusive mode may be configured to exclusively supply the electric power transmitted from the external power source 91 to the rechargeable battery 130. When the plurality of devices charge mode is selected, the distribution rate calculator 121 may calculate a power distribution rate to allow a certain amount of the electric power to be supplied to each of the peripheral device 140 and at the same time, to allow the rechargeable battery 130 to be fully charged during a charge request period. When the rechargeable battery charge exclusive mode is selected, the distribution rate calculator 121 may determine a power distribution rate to allow the electric power to be supplied to the rechargeable battery 130, exclusively.

In addition, the distribution rate calculator 121 may calculate a power distribution rate according to a charge request period that is input by a user though the user interface 171 of the display apparatus for vehicle 170 and/or the user interface 205 of the terminal apparatus 200. Particularly, when a charge request period is input, the distribution rate calculator 121 may determine a rate of electric power supplied to the rechargeable battery 130 among the entire electric power, which is to allow the rechargeable battery 130 to be fully charged within the charge request period (hereinafter referred to as "a power distribution rate of the rechargeable battery 130), and according to cases, may determine a rate of electric power supplied to the peripheral device 140 besides the rechargeable battery 130 among the entire electric power (hereinafter referred to as "a power distribution rate of the peripheral device 140). When a rate of electric power applied to the rechargeable battery 130 to the entire electric power is approximately 100%, that is the entire electric power is needed to be supplied to the rechargeable battery 130 to fully charge the rechargeable battery 130 within a charge request period, the distribution rate calculator 121 may determine a power distribution rate of the peripheral device 140 as 0% or an approximate value of 0%.

When a pre-determined power distribution rate adjustment command is input though the user interface 171 of the display apparatus for vehicle 170 and/or the user interface 205 of the terminal apparatus 200, the distribution rate calculator 121 may adjust a power distribution rate of the rechargeable battery 130 and each of the peripheral device 140 according to an adjustment command. A detail description of the power distribution rate calculated by the distribution rate calculator 121 will be described later.

The control signal generator 122 may generate a control signal according to the power distribution rate transmitted from the distribution rate calculator 121 and transmit the generated control signal to the charge controller 123. The charge controller 123 may distribute the electric power supplied from the external power source 91 based on the transmitted control signal so as to supply to at least one of the rechargeable battery 130 and the peripheral device 140. In addition, the control signal generator 122 may generate a control signal related to at least one of the wheel driving motor 101, the engine 102, the peripheral device 140 and the communicator 190 to transmit the generated control signal to the appropriate object 101, 102, 140, and 190 so that at least one of the vehicle wheel driving motor 101, the engine 102, the peripheral device 140 and the communicator 190 may perform a certain operation.

The charge controller 123 may distribute the electric power transmitted via the power input unit 110 to allow the electric power to be supplied to at least one of the rechargeable battery 130 and the peripheral device 140. The charge controller 123 may be electrically connected to the power input unit 110, the rechargeable battery 130 and the peripheral device 140 in a direct or indirect manner, to distribute the electric power transmitted via the power input unit 110 according to the power distribution rate determined by the distribution rate calculator 121 so that the distributed electric power may be supplied to at least one of the rechargeable battery 130 and the peripheral device 140. The charge controller 123 may distribute the electric power supplied to the rechargeable battery 130 and the peripheral device 140 such that the charge controller 123 may distribute electric power by using a variety of components, e.g., an embedded circuit and a cable to allow the distributed electric power to be transmitted to at least one of the rechargeable battery 130 and the peripheral device 140.

In some forms, the charge controller 123 may be implemented by the BMS. The BMS may be provided to perform a variety of functions related to the rechargeable battery 130. For example, the BMS may perform the variety of functions, e.g., surveilling a state of the rechargeable battery 130, collecting information related to the state of the rechargeable battery 130, performing authenticating of the rechargeable battery 130, supplying electric power to the rechargeable battery 130, stopping the supply of the electric power to the rechargeable battery 130, and preventing the rechargeable battery 130 from being operated in an unusual condition. As for a hybrid electric vehicle, the BSM may perform changing a current transmission direction from a direction of the rechargeable battery 130 to a direction of the wheel driving motor 101 or changing the current transmission direction from a direction of the wheel driving motor 101 to a direction of the rechargeable battery 130.

The distribution rate calculator 121, the control signal generator 122 and/or the charge controller 123 may be physically or logically divided into each other. When the distribution rate calculator 121, the control signal generator 122 and/or the charge controller 123 are physically divided into each other, at least one of the distribution rate calculator 121, the control signal generator 122 and the charge controller 123 may be implemented by a different component. For example, the distribution rate calculator 121 and the control signal generator 122 may be implemented by a microprocessor designed by using at least one semiconductor, and the charge controller 123 may be implemented by the above-mentioned BSM. When the distribution rate calculator 121, the control signal generator 122 and/or the charge controller 123 are logically divided into each other, the distribution rate calculator 121, the control signal generator 122 and/or the charge controller 123 may be implemented by the same microprocessor.

The rechargeable battery 130 may be configured to store an electric energy and to supply needed electric power to components inside of the vehicle 100, e.g., the wheel driving motor 101 and the peripheral device 140, as needed. The rechargeable battery 130 may be electrically connected to the charge controller 123 to receive all or a part of the electric power input via the power input unit 110, so as to be charged by the received electric power. In this case, the rechargeable battery 130 may receive a part of the electric power according to the power distribution rate of the rechargeable battery 130.

The rechargeable battery 130 may be implemented by using at least one of a lithium-titanium storage battery, a lithium-polymer battery, a lithium-ion battery or a lithium-based battery such as a lithium-air battery, a lead battery, a nickel-cadmium battery, a sodium-nickel chloride battery.

As illustrated in FIG. 3, the rechargeable battery 130 may be installed in a lower portion of the vehicle 100, in the inside of the front portion 104 of the vehicle 100, in the inside of a rear portion of the vehicle 100, or a rear side of a backseat. In addition, the rechargeable battery 130 may be installed in a variety of positions according to a designer's selection.

The peripheral device 140 may represent a variety of devices installed inside or outside of the power input unit 110 and configured to be operatable by electric power supplied from the rechargeable battery 130 or the external power source 91.

The peripheral device 140 may include at least one of the air conditioning device 141, an interior light 142, an exterior light 143, a gauge board 144, a radio reception device 145, a wired charger 150, a wireless charger 160, and a display apparatus for vehicle 170. In some forms, the peripheral device 140 may include other device, e.g., a wiper, other than the above-mentioned devices. In addition, the peripheral device 140 may exclude any of the above-mentioned devices 141 to 145, 150, 160, 170. The range and the type of the peripheral device 140 may be selected or defined in various ways according to a designer's selection.

The air conditioning device 141 may be configured to adjust a temperature of air inside of the vehicle 100. The interior light 142 may be configured to emit a light to all or a part of the inside of the vehicle 100. The exterior light 143 may be configured to emit a light to the front side and/or the rear side of the vehicle 100. The gauge board 144 may be installed in a front side of a steering wheel and configured to provide a variety of information to a driver, wherein the variety of information may include a speed of the vehicle 100, a RPM, a fuel residual quantity, a current amount of charge of the rechargeable battery 130, a temperature of coolant and/or current time. The radio reception device 145 may be installed in a center fascia and configured to receive a radio broadcast signal and reproduce the received broadcast signal thereby providing a radio broadcast to a user.

The wired charger 150 may be electrically connected to an external device such as a terminal device, e.g., a smart phone, and configured to allow an external device to be charged by supplying electric power to the external device when the external device is connected. The wired charger 150 may include a connection terminal 151 to be connected to the external device, and the connection terminal 151 may include Universal Serial Bus (USB) and High Definition Multimedia Interface (HDMI), but is not limited thereto. A variety of terminals may be used as the connection terminal 151 according to the designer's selection. The external device may be directly connected to the connection terminal 151 or connected to the connection terminal 151 via the cable, and when the external device is connected to the connection terminal 151, an electric power, which is supplied from the external power source 91 and input via the power input unit 110, and/or electric power transmitted from the rechargeable battery 130 may be transmitted to the external device via the connection terminal 151 of the wired charger 150. Accordingly, the external device may be charged.

The wireless charger 160 may be configured to charge an external device such as a terminal device, e.g., a smart phone in a wireless manner. In some forms, the wireless charger 160 may include a magnetic field generator 161. The magnetic field generator 161 may be implemented by a coil. When the electric power, which is supplied from the external power source 91 and input via the power input unit 110, and/or the electric power transmitted from the rechargeable battery 130 is applied to the coil, the coil may generate a magnetic field according to the application of the electric power. A coil embedded in the external device may induce the current according to the magnetic field generated by the coil of the wireless charger 160, and the induced electric power may be transmitted to the rechargeable battery inside of the external device. Accordingly, the rechargeable battery of the external device may be charged.

The display apparatus for vehicle 170 may be installed inside of the vehicle 100 to display a variety of Information related a navigation system, e.g., a map and a driving route, a variety of information related to the vehicle 100 and/or a variety of information needed for a driver or a passenger. In addition, the display apparatus for vehicle 170 may display a variety of broadcasts and stored images to provide the broadcasts and the stored images to the driver or the passenger. In some forms, the display apparatus for vehicle 170 may include a speaker and the display apparatus for vehicle 170 may be configured to output a voice or a sound. The display apparatus for vehicle 170 may be separately manufactured from the vehicle 100 and then installed in the inside of the vehicle 100, e.g., an upper portion of the dashboard or a lower portion of the windshield. The display apparatus for vehicle 170 may be a navigation device.

In some forms, the display apparatus for vehicle 170 may include a user interface 171, a communicator 172 and a controller 173.

The user interface 171 may receive an input of a variety of information from a user and provide a variety of information to a user in a visual and/or acoustic manner. The user interface 171 may include a display implemented by a display panel, and the display may be implemented by a touch screen. In some forms, the user interface 171 may perform the same function as that of the user interface 205 of the terminal apparatus 200. For example, the user interface 171 may provide information related to the power distribution rate to a user, e.g., a driver and/or may receive an input of a power distribution rate adjustment command or a mode selection command from a user.

The communicator 172 may be provided to be communicable with the display apparatus for vehicle 170, the communicator 190 inside of the vehicle 100, a communicator 97 of the server device 99 and/or a communicator 201 of the terminal apparatus 200. The communicator 172 may be perform a communication with the communicator 190 of the vehicle 100 via the CAN communication system, and may perform a communication with the communicator 97 of the server device 99 and/or the communicator 201 of the terminal apparatus 200 via the wireless communication network implemented by the mobile communication technology.

In some forms, the communicator 172 of the display apparatus for vehicle 170 may be configured to perform a communication between the vehicle 100 and the terminal apparatus 200 or a communication between the vehicle 100 and the server device 99. For example, the communicator 172 may receive the power distribution rate from the communicator 190 of the vehicle 100 and transmit the power distribution rate to the communicator 97 of the server device 99 or the communicator 201 of the terminal apparatus 200. In addition, the communicator 172 may receive information related to an amount of current charge of the rechargeable battery 130, an amount to be additionally charged, a needed time for a full charge, and transmit the information to the communicator 97 of the server device 99 or the communicator 201 of the terminal apparatus 200. The communicator 172 may receive the power distribution rate adjustment command or the mode selection command from the communicator 97 of the server device 99 or the communicator 201 of the terminal apparatus 200 and transmit the power distribution rate adjustment command or the mode selection command to the communicator 190 of the vehicle 100. When the communicator 172 of the display apparatus for vehicle 170 performs the communication between the vehicle 100 and the terminal apparatus 200 or the communication between the vehicle 100 and the server device 99, the communicator 190 of the vehicle 100 may be omitted.

The controller 173 may be configured to control an entire operation of the display apparatus for vehicle 170. In some forms, the controller 173 of the display apparatus for vehicle 170 may be configured to perform all or a part of the above-mentioned functions of the controller 120 of the vehicle 100. Particularly, the controller 173 may be configured to perform all or a part of the function of the distribution rate calculator 121 by using the same method or a modified method. When the controller 173 of the display apparatus for vehicle 170 performs all or a part of the function of the controller 120 of the vehicle 100, the communicator 172 may receive at least one piece of information among an amount of charge, an amount to be charged, a needed time for a full charge from the communicator 190 of the vehicle 100, and the controller 173 may determine a power distribution rate based on the transmitted information. The power distribution rate determined by the controller 173 may be transmitted to the control signal generator 122 via the communicator 190 of the vehicle 100. When the controller 173 of the display apparatus for vehicle 170 performs all or a part of the function of the controller 120 of the vehicle 100, the distribution rate calculator 121 may be omitted.

The communicator 190 of the vehicle 100 may be provided to be communicable with at least one of the communicator 97 of the server device 99 and the communicator 201 of the terminal apparatus 200. As mentioned above, the communicator 190 may be provided to be communicable with at least one of the communicator 97 of the server device 99 and the communicator 201 of the terminal apparatus 200 via at least one of the wired communication network and the wireless communication network. When the communicator 190 performs a wireless communication, the communicator 190 may be implemented by an antenna, a communication chip, a component related to the wireless communication. When the communicator 190 performs a wired communication, the communicator 190 may include a connector to which a terminal of a cable is coupled.

Hereinafter the server device 99 will be described.

The server device 99 may receive information related to the power distribution rate transmitted via the communicator 190 of the vehicle 100, and transmit the received information related to the power distribution rate to the terminal apparatus 200 with a processing or without a processing. The server device 99 may receive at least one of an amount of charge, an amount to be charged, a needed time for a full charge of the rechargeable battery 130 from the vehicle 100 and transmit the received information related to an amount of charge, an amount to be charged, a needed time for a full charge of the rechargeable battery 130 to the terminal apparatus 200 with a processing or without a processing.

The communicator 97 of the server device 99 may be provided to be communicable with at least one of the communicator 190 of the vehicle 100 ad the communicator 201 of the terminal apparatus 200 through at least one of the wired communication network and/or the wireless communication network. In some forms, the communicator 97 of the server device 99 may be communicable with the communicator 172 of the display apparatus for vehicle 170.

The controller 98 may be configured to control an overall operation of the server device 99. In some forms, the controller 98 may be configured to perform all or a part of the above-mentioned functions of the controller 120 of the vehicle 100. Particularly, the controller 98 may be configured to perform all or a part of the function of the distribution rate calculator 121 by using the same method or a modified method. The communicator 97 of the server device 99 may receive at least one piece of information among an amount of charge, an amount to be charged, a needed time for a full charge from the vehicle 100, and the controller 98 may determine a power distribution rate based on the transmitted information. The power distribution rate determined by the controller 98 may be transmitted to at least one of the vehicle 100 and the terminal apparatus 200.

Hereinafter the terminal apparatus 200 will be described later.

Figure 4:
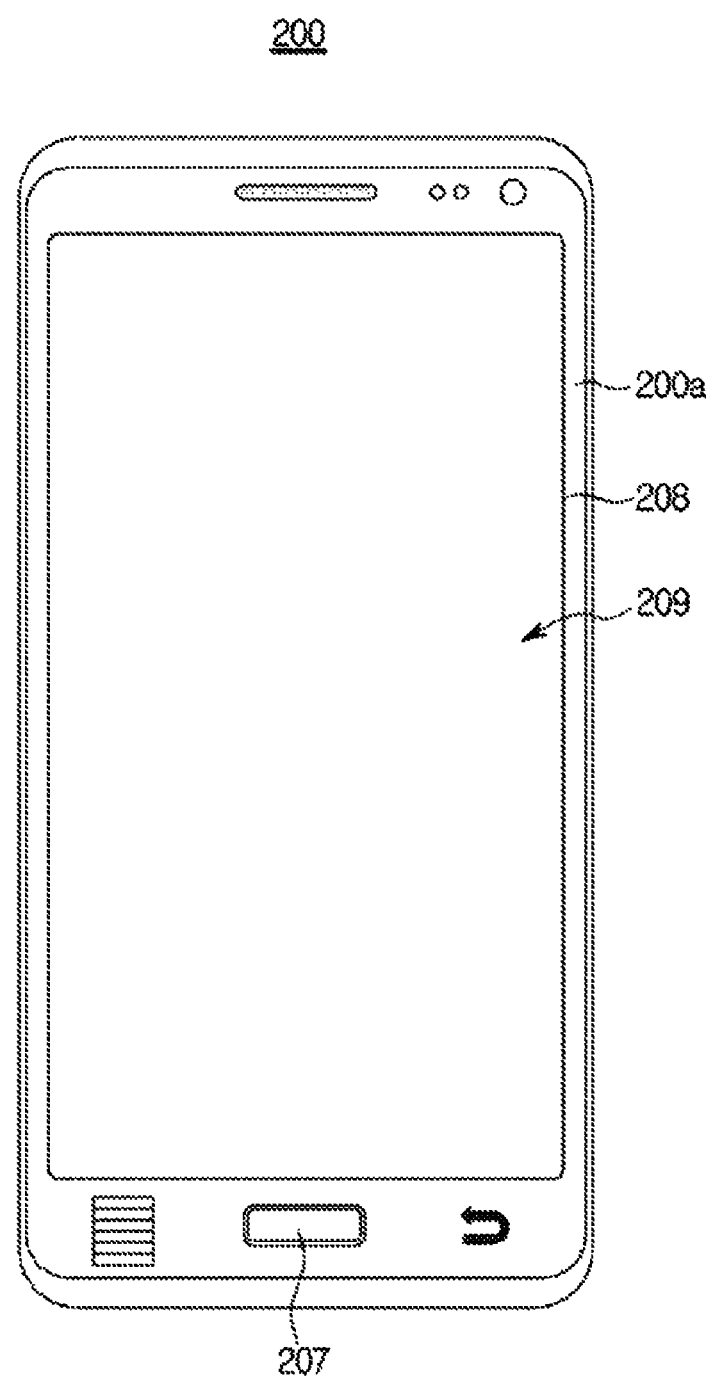
FIG. 4 is a view illustrating a terminal apparatus.

FIG. 4 is a view illustrating a terminal apparatus.

As illustrated in FIGS. 2 to 4, the terminal apparatus 200 may include a communicator 201, a controller 203, and a user interface 205.

The communicator 201 of the terminal apparatus 200 may be provided to be communicable with at least one of the communicator 190 of the vehicle 100 and the communicator 97 of the server device 99 through at least one of the wired communication network and/or the wireless communication network. In some forms, the communicator 201 of the terminal apparatus 200 may be communicable with the communicator 172 of the display apparatus for vehicle 170.

The communicator 201 may receive information related to the power distribution rate determined by the distribution rate calculator 121 from at least one of the vehicle 100 and the server device 99. In some forms, the communicator 201 may further receive at least one piece of information among an amount of charge, an amount to be charged, a needed time for a full charge of the rechargeable battery 130 from at least one of the vehicle 100 and the server device 99.

The controller 203 may be provided to control an overall operation of the terminal apparatus 200. For example, the controller 203 may control an operation of the user interface 205 of the terminal apparatus 200.

In some forms, the controller 203 of the terminal apparatus 200 may be configured to perform all or a part of the above-mentioned functions of the controller 120 of the vehicle 100. Particularly, the controller 203 may be configured to perform all or a part of the function of the distribution rate calculator 121 by using the same method or a modified method. The communicator 201 of the terminal apparatus 200 may receive at least one piece of information among an amount of charge, an amount to be charged, a needed time for a full charge from the vehicle 100 directly or through the server device 99, and the controller 203 may automatically determine a power distribution rate based on at least one information among an amount of charge, an amount to be charged, a needed time for a full charge.

The controller 203 may adjust the power distribution rate transmitted from the vehicle 100 according to a user's power distribution rate adjustment command input via the user interface 205, and transmit the adjusted power distribution rate to the vehicle 100 directly or indirectly through the server device 99. In this case the controller 120 of the vehicle 100 may allow the electric power to be distributed so as to be supplied to at least one of the rechargeable battery 130 and the peripheral device 140 based on the adjusted power distribution rate transmitted from the terminal apparatus 200.

The controller 203 of the terminal apparatus 200 may be implemented by using one or more semiconductor.

The user interface 205 may be configured to display a variety of information to a user and/or configured to receive an input of a variety of command from a user. The user interface 205 may include a display 206 and an input unit 207.

The display 206 may be implemented by various kinds of display panels, e.g., Liquid Crystal Display (LCD) panel or Light Emitting Diode (LED) panel. As illustrated in FIG. 4, the display panel may be coupled to an exterior housing 200a of the terminal apparatus 200 such that all or a part of the display panel is exposed to provide a certain screen 209 to a user.

The input unit 207 may be provided to receive various commands from a user. The input unit 207 may be implemented using a physical button, a touch pad, a trackball, a track pad, a joystick, and a switch device.

In some forms, the user interface 205 may include a touch screen 208. The touch screen 208 may be provided to receive an input of a certain command according to a touch gesture that is applied from a user. When the touch screen 208 is provided, the display 206 and the input unit 207 may be omitted.

Hereinafter various forms of determining a distribution rate of power supplied to the rechargeable battery 130 and the peripheral device 140 will be described.

Hereinafter for convenience of description, various embodiments will be described with an example in which the terminal apparatus 200 is a smart phone and the terminal apparatus 200 performs a various functions, e.g., selecting a mode or inputting a power distribution rate adjustment command. However, the terminal apparatus 200 may be not limited to a smart phone, and thus embodiments may be applied to a case in which the terminal apparatus 200 is a laptop computer or a tablet PC as the same method or a modified method. In addition, forms described later may be performed in the display apparatus for vehicle 170 as well as the terminal apparatus 200 without change or with partial modification.

Figure 5:
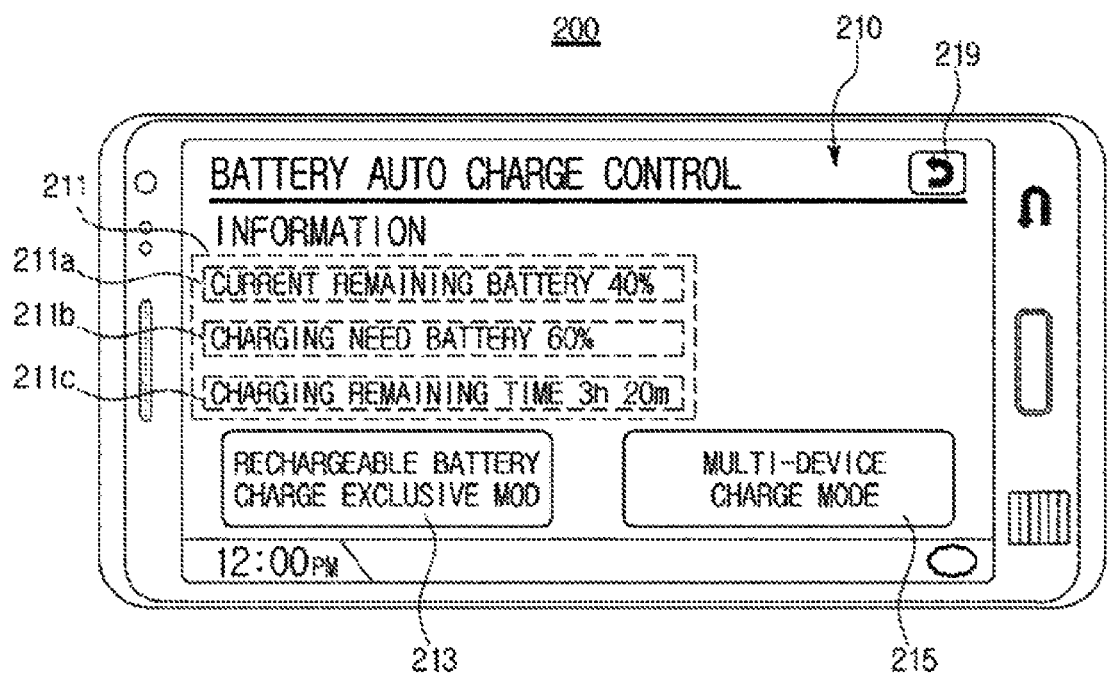
FIG. 5 is a view illustrating an example of a charge mode selection screen displayed in a terminal apparatus.

FIG. 5 is a view illustrating an example of a charge mode selection screen displayed in a terminal apparatus.

As illustrated in FIG. 5, when electric power is supplied from the outside since the external power source 91 is connected to the connection terminal 110 of the vehicle 100, the display 206 and/or the touch screen 208 of the terminal apparatus 200 may display a charge mode selection screen 210 that is a graphic user interface to select a charge mode.

In some forms, in the charge mode selection screen 210, an image for charge mode selection 213 and 215 may be displayed, and a variety of information 211 related to charging the rechargeable battery 130 may be further displayed.

The variety of information related to charging the rechargeable battery 130 (211) may include at least one of a current amount of charge of the rechargeable battery 130 (211a), an amount of charge for a full charge of the rechargeable battery 130 (211b), and a required time for a full charge of the rechargeable battery 130 (211c). At least one of the current amount of charge (211a), the amount of charge for a full charge (211b) and the a required time for a full charge of the rechargeable battery 130 (211c) may be acquired or calculated by at least one of the controller 120 of the vehicle 100, the controller 173 of the display apparatus for vehicle 170, the controller 98 of the server device 99, and the controller 203 of the terminal apparatus 200.

In addition, as needed, the charge mode selection screen 210 may cancel selecting the charge mode, and may further display an image for cancellation of selection 219 so that the display 206 and/or the touch screen 208 may display another screen. When a user selects the image for cancellation of selection 219 by using a touch operation, or a movement of a cursor, the terminal apparatus 200 may complete an operation related to the charge mode selection.

The image for charge mode selection 213 and 215 may be displayed to support a user's charge mode selection.

In some forms, the image for charge mode selection may include an image to select a rechargeable battery charge exclusive mode 213 and an image to select a plurality of devices charge mode 215.

For example, when the charge mode selection screen 210 is displayed by the touch screen 208, a user may select any one of the image to select a rechargeable battery charge exclusive mode 213 and the image to select a plurality of devices charge mode 215 by touching any one of the image to select a rechargeable battery charge exclusive mode 213 and the image to select a plurality of devices charge mode 215. In addition, for another example, when the charge mode selection screen 210 is displayed by the display 206 implemented by a liquid display panel, a user may move a cursor or a focus to any one of the image to select a rechargeable battery charge exclusive mode 213 and the image to select a plurality of devices charge mode 215 by operating a keyboard, a touch pad, a track pad or a mouse device, and then select any one of the rechargeable battery charge exclusive mode and the plurality of devices charge mode by inputting a selection command. In addition, a user may select any one of the rechargeable battery charge exclusive mode and the plurality of devices charge mode by using various methods by a designer's selection.

FIG. 6 is a table illustrating an example of a charge distribution.

When the rechargeable battery charge exclusive mode is selected, the terminal apparatus 200 may transmit a signal indicating that the rechargeable battery charge exclusive mode is selected to the controller 120 of the vehicle 100. The signal of selection of the rechargeable battery charge exclusive mode may be transmitted to the vehicle 100 via the communicator 201 of the terminal apparatus 200, and the vehicle 100 may directly receive the signal by using the communicator 190 or indirectly receive the signal via the communicator 172 of the display apparatus for vehicle 170. As needed, the transmission of the signal may be performed via the server device 99.

The distribution rate calculator 121 may receive the signal of selection of the rechargeable battery charge exclusive mode, and in response to the received signal, may determine a power distribution rate so that all of electric power is supplied to the rechargeable battery 130 while any portion of electric power is not supplied to the peripheral device 140, as illustrated in FIG. 6. That is, the distribution rate calculator 121 may determine that a distribution rate of the rechargeable battery 130 is 100% while determining that a distribution rate of the peripheral device 140 is 0%.

The control signal generator 122 may generate a control signal to correspond to the result of the determination of the distribution rate calculator 121 and transmit the generated control signal to the charge controller 123. The charge controller 123 may control electric power so that all of the electric power supplied via the power input unit 110 is transmitted to the rechargeable battery 130 in response to the control signal. Accordingly, the electric power may be supplied to only the rechargeable battery 130, and the rechargeable battery 130 may store an electric energy according to the supplied electric power.

Figure 7:
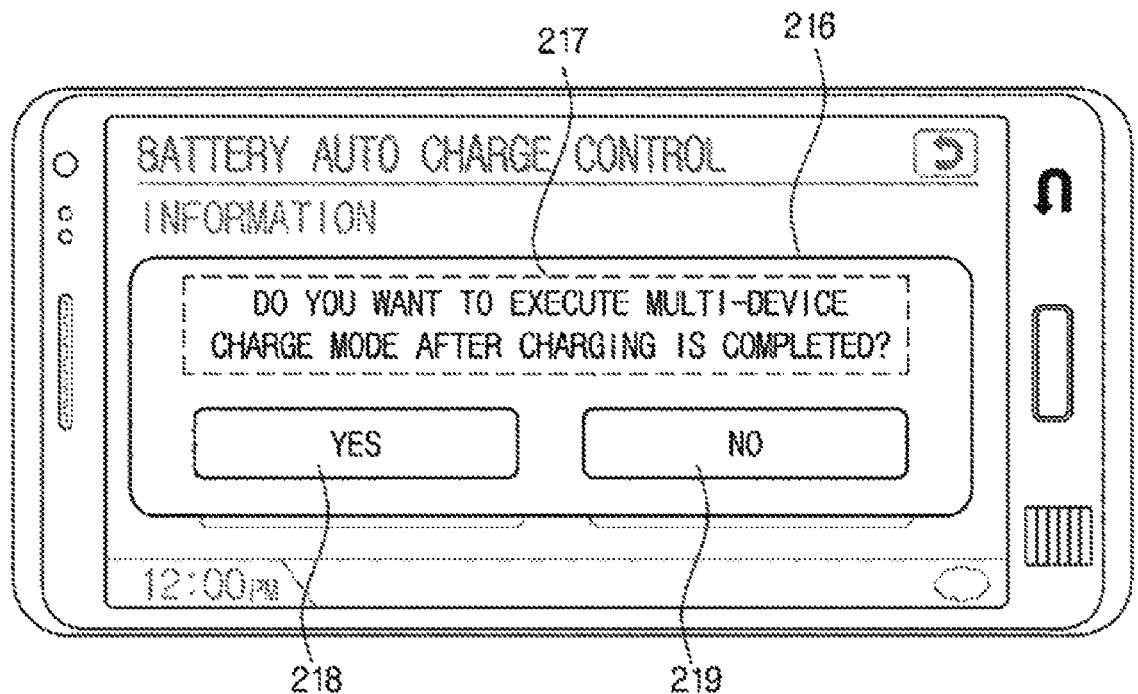
FIG. 7 is a view illustrating an example of a screen to additionally select a plurality of devices charge mode.

FIG. 7 is a view illustrating an example of a screen to additionally select a plurality of devices charge mode.

In some forms, when the rechargeable battery charge exclusive mode is selected, the user interface 205 of the terminal apparatus 200 may further display a message asking whether, after the charge is completed, the plurality of devices charge mode is executed or not, as illustrated in FIG. 7, and may display an image to select whether to execute the plurality of devices charge mode after the charge is completed 218 and 219. The message 217 and the image to select whether to execute the plurality of devices charge mode after the charge is completed 218 and 219 may be displayed by using a pop-up window 216 that is displayed to be overlapped with the charge mode selection screen 210, or may be displayed by using another screen that is separately designed from the charge mode selection screen 210.

When a user selects an image 218 related to an authentication for the execution of the plurality of devices charge mode after the charge is completed, that is an image in which a sign of "YES" is present, the result of the selection may be transmitted to the controller 120 of the vehicle 100 in an electrical signal type. Accordingly, the charge controller 123 may control charging so that the electric power is supplied to at least one of the rechargeable battery 130 and the peripheral device 140 according to the plurality of devices charge mode, when the rechargeable battery 130 is fully charged. In contrast, when a user selects an image 219 related to a rejection for the non-execution of the plurality of devices charge mode after the charge is completed, that is an image in which a sign of "NO" is present, the result of the selection may be transmitted to the controller 120 of the vehicle 100 in an electrical signal type. Accordingly, the charge controller 123 may not execute an operation according to the plurality of devices charge mode, when the rechargeable battery 130 is fully charged. In this case, the charge controller 123 may maintain supplying the electric power to the rechargeable battery 130 or prevent supplying the electric power to the rechargeable battery 130.

Figure 8:
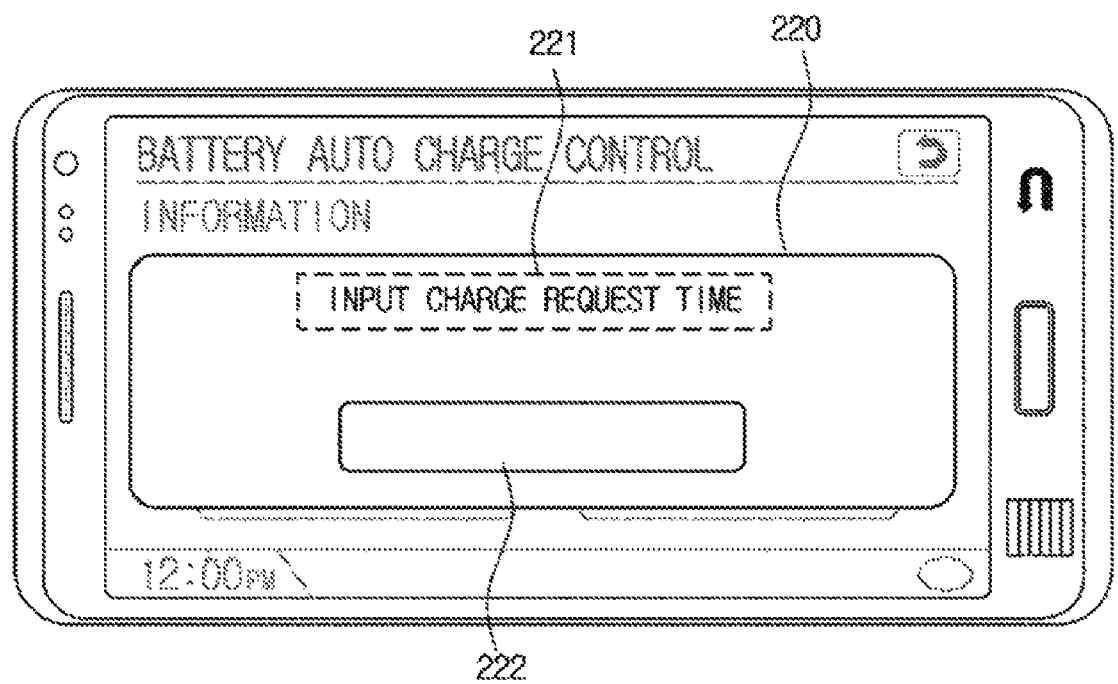
FIG. 8 is a view illustrating an example of a charge request period input screen.

FIG. 8 is a view illustrating an example of a charge request period input screen.

When a user selects the plurality of devices charge mode by selecting the image to select a plurality of devices charge mode 215, the terminal apparatus 200 may further display a message 221 asking an input of a charge request period, and may further display an input window 222 of the charge request period according to a designer's selection. The message 221 and/or the input window 222 may be displayed by using a pop-up window 220 that is displayed to be overlapped with the charge mode selection screen 210, or may be displayed by using another screen that is separately designed from the charge mode selection screen 210.

When a user inputs a charge request period, i.e., 8 hours, by inputting numbers to the input window 222, the controller 203 of the terminal apparatus 200 may determine a power distribution rate in accordance with the charge request period by using the charge request period.

For example, the controller 203 of the terminal apparatus 200 may determine a power distribution rate of the rechargeable battery 130 so that the rechargeable battery 130 is fully charged during the charge request period, and then determine a power distribution rate of the peripheral device 140. Particularly, the controller 203 may calculate a power distribution rate of the rechargeable battery 130 by calculating the size of the electric power that is needed to fully charge the rechargeable battery 130 during the charge request period based on a chargeable amount of the rechargeable battery 130, and then the controller 203 may determine a power distribution rate between the rechargeable battery 130 and the peripheral device 140 by calculating a power distribution rate of the peripheral device 140 by using the size of the electric power supplied via the power input unit 110 and the size of the electric power supplied to the rechargeable battery 130. Particularly, as illustrated in FIG. 6, when electric power is distributed and then supplied to the rechargeable battery 130 and each of the peripheral device 140, e.g., a first peripheral device to a third peripheral device, a sum (Z) of a distribution rate (X) of power distributed to the rechargeable battery 130, and a distribution rate (Y) of power distributed to all of the peripheral devices (Y1 to Y3) may be 100%. The controller 203 may calculate a power distribution rate of the rechargeable battery 130 (X), calculate a power distribution rate of the entire of the peripheral device ($\Sigma Y$ i) by subtracting the power distribution rate of the rechargeable battery 130 (X) from 100%, and then determine a distribution rate of the first peripheral device, the second peripheral device, and the third peripheral device (Y1, Y2, and Y3) by distributing the power distribution rate of the entire of the peripheral device ($\Sigma Y$ i) according to a pre-determined ratio. In this case, in some forms, the controller 203 may determine the distribution rate of the first peripheral device, the second peripheral device, and the third peripheral device (Y1, Y2, and Y3) as the same rate, as a different rate in some thereof or as a three different rate. When at least one of the distribution rate of the first peripheral device to the third peripheral device (Y1, Y2, and Y3) is determined to be different from each other, the controller 203 may determine that at least one of the distribution rate of the first peripheral device to the third peripheral device (Y1, Y2, and Y3) is different from each other by using a pre-determined weighted value or an amount of power consumption. Accordingly, the power distribution rate of the rechargeable battery 130 (X) and the power distribution rate of the peripheral device 140 (Y1, Y2, and Y3) may be determined.

The controller 203 of the terminal apparatus 200 may further calculate an expected amount of charge. Particularly, the controller 203 of the terminal apparatus 200 may further calculate an expected amount of charge based on the power distribution rate of the rechargeable battery 130. In addition, when the peripheral device 140 is the wired charger 150 and/or the wireless charger 160, the controller 203 may calculate an expected amount of charge of a rechargeable battery (not shown) of anther terminal apparatus, e.g., a smart phone, that is charged by the wired charger 150 and/or the wireless charger 160. In some forms, the controller 203 may calculate an expected amount of charge by using the size of supplied power, e.g., the current size, the current amount of charge, and a charge request period input by a user, particularly, by using a value acquired by multiplying the current size and the charge request period, and the current amount of charge.

Hereinbefore an example in which the controller 203 of the terminal apparatus 200 calculates a power distribution rate and an expected amount of charge is described, but the power distribution rate and an expected amount of charge may be calculated by using at least one of the controller 120 of the vehicle 100, the controller 173 of the display apparatus for vehicle 170, and the controller 98 of the server device 99, instead of the controller 203 of the terminal apparatus 200.

Figure 9:
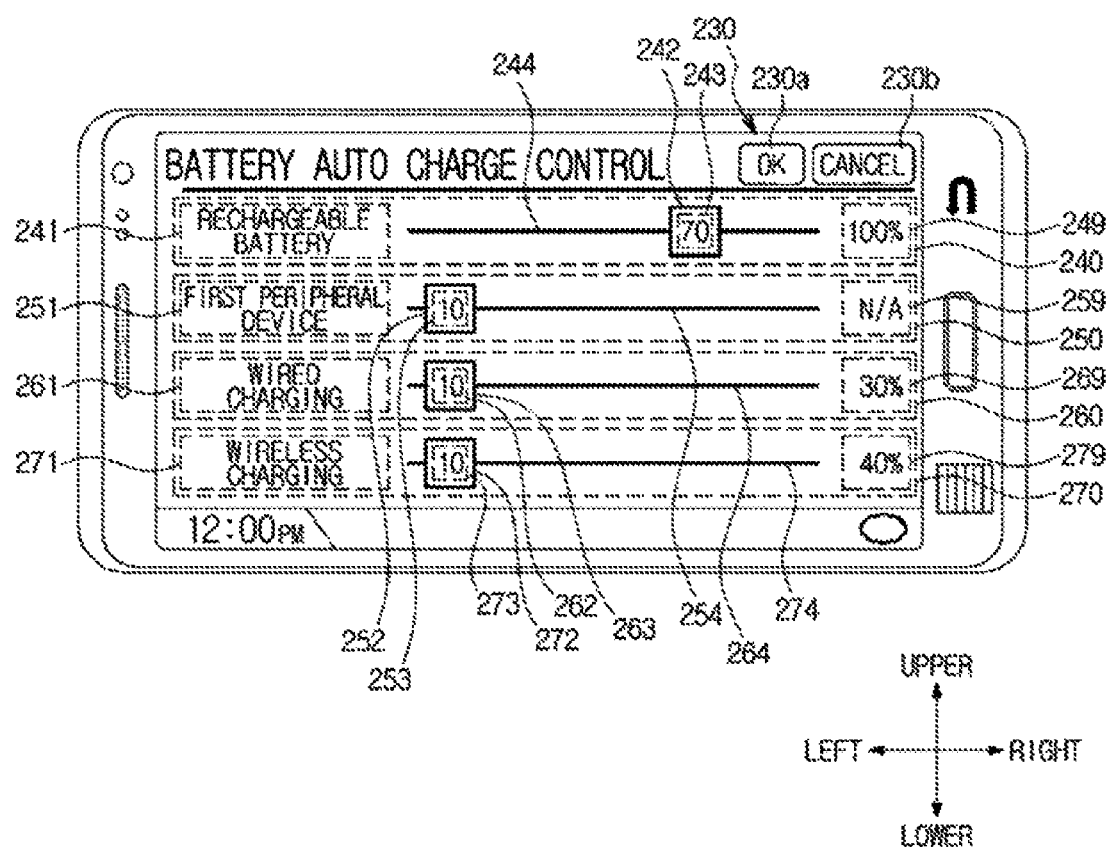
FIG. 9 is a view illustrating an example of a power distribution rate adjustment screen.

FIG. 9 is a view illustrating an example of a power distribution rate adjustment screen. FIG. 9 illustrates an example of a screen configured to adjust a power distribution rate of each of the rechargeable battery 130, the first peripheral device, e.g., the air conditioning device 141, the wired charger 150 and the wireless charger 160, but the peripheral device, in which a power distribution rate is adjustable, is not limited to as illustrated in FIG. 9. For example, the power distribution rate adjustment screen may be configured to adjust a power distribution rate of another peripheral device, e.g., the radio reception device 145, and the display apparatus for vehicle 170, instead of the wireless charger 160. In addition, the number of the peripheral devices whose a power distribution rate is adjustable, is not limited to four, as illustrated in FIG. 9, and thus the number of the peripheral may be less or larger than four.

As mentioned above, when the power distribution rate and the expected amount of charge are determined by the controller 203, the terminal apparatus 200 may display a power distribution rate adjustment screen 230, as illustrated in FIG. 9. The power distribution rate adjustment screen 230 may be displayed to receive an input of an adjustment command of the power distribution rate from a user.

The power distribution rate adjustment screen 230 may include an image to input a complete selection command 230a, an image to input a cancellation selection command 230b, a rechargeable battery distribution rate adjustment area 240, a first peripheral device distribution rate adjustment area 250, a wired charger distribution rate adjustment area 260, and a wireless charger distribution rate adjustment area 270.

In each of the distribution rate adjustment area 240, 250, 260, and 270, an object name of adjustment 241, 251, 261 and 271, a tool to display a power distribution rate of an object of adjustment 242, 243, 252, 253, 262, 263, 272, and 273, and an expected amount of charge 249, 259, 269, and 279 may be displayed.

The object name whose power distribution rate is adjusted 241, 251, 261 and 271 may be displayed on the power distribution rate adjustment screen 230 to select which of object is adjusted by a user.

The tool to display a power distribution rate of an object whose a power distribution rate is adjustable 242, 243, 252, 253, 262, 263, 272 and 273 may include an image 242, 252, 262, and 272, and/or a number 243, 253, 263, and 273. The image 242, 252, 262, and 272 may display a power distribution rate according to a position of the image 242, 252, 262, and 272. For example, as the image 242, 252, 262, and 272 is placed in the left side of the screen 230, it may represent that the power distribution rate is lower, and as the image 242, 252, 262, and 272 is placed in the right side of the screen 230, it may represent that the power distribution rate is higher. In the left and/or right side of the image 242, 252, 262, and 272, a guide 244, 254, 264, and 274 may be further displayed to indicate a route in which the image 242, 252, 262, and 272 is movable, and the guide 244, 254, 264, and 274 may be displayed in the form of line. The number 243, 253, 263, and 273 may inform a user a power distribution rate as a number, and may be displayed in an inner side of the image 242, 252, 262, and 272.

The expected amount of charge 249, 259, 269, and 279 may represent an expected amount of charge of an object whose power distribution rate, which is calculated as mentioned above in the controller 203, is adjusted. When the object of adjustment is a device that is not needed to be charged or that is impossible to be charged, e.g., the air conditioning device 141, the expected amount of charge may be not displayed or a symbol or a letter 259 indicating that an expected amount of charge is not calculated may be displayed.

As mentioned above, the controller 203 may firstly calculate a power distribution rate of the rechargeable battery 130 to allow the rechargeable battery 130 to be fully charged that is the expected amount of charge 249 of the rechargeable battery 130 becomes 100% when determining a power distribution rate. For example, as illustrated in FIG. 9, the controller 203 may determine a power distribution rate of the rechargeable battery 130 as 70%. In this case, the rechargeable battery 130 may be fully charged when a charge request period is expired or before the charge request period is expired. In addition, the controller 203 may determine each of a power distribution rate of another peripheral device, i.e., the first peripheral device (141 to 145, 170), the wired charger 150 and the wireless charger 160 as 10%. Accordingly, the user interface 205 of the terminal apparatus 200 may display the power distribution rate of each of the peripheral device by using the image 242, 252, 262, and 272, and/or the number 243, 253, 263, and 273.

When the power distribution rate determined by the controller 203 is displayed, a user may adjust the power distribution rate by operating the input unit 207 or the touch screen 208 of the user interface 205. For example, a user may adjust the power distribution rate by changing a position of the image 242, 252, 262, and 272 by pressing an arrow key or by applying a touch gesture, e.g., a drag gesture, in the touch screen 208. In some forms, a user may input a command to adjust the power distribution rate by changing the position of the image 242, 252, 262, and 272 by dragging the image 242, 252, 262, and 272 by using the mouse device. Particularly, for example, a user may input a command to reduce the power distribution rate of the rechargeable battery 130 by moving the image 242 indicating the power distribution rate to the left side, or may input a command to increase the power distribution rate of the rechargeable battery 130 by moving the image 242 to the right side.

Figure 10:
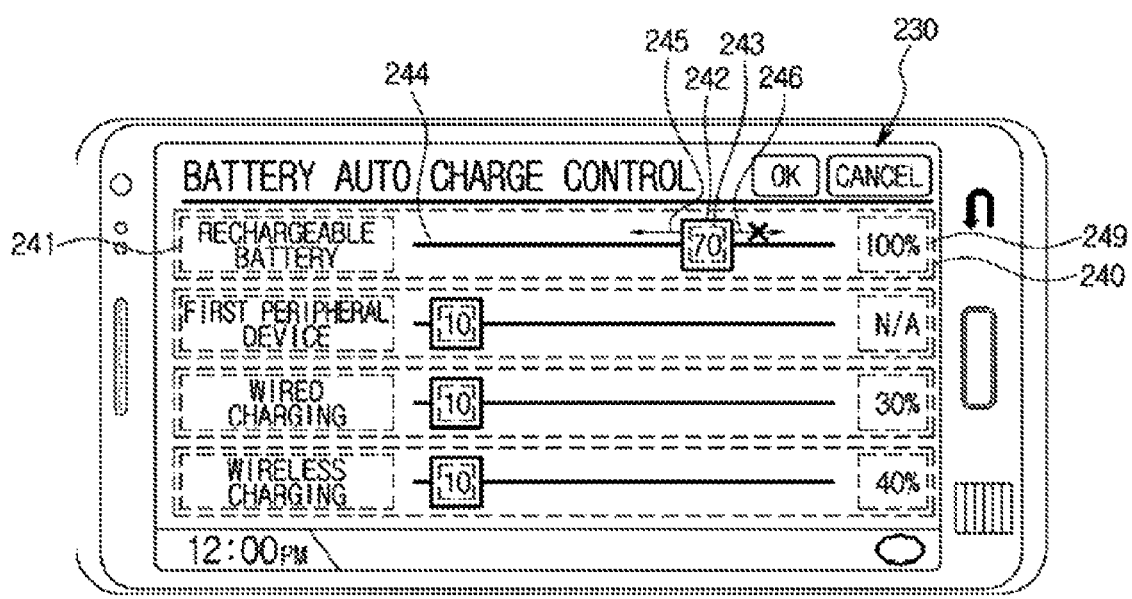
FIG. 10 is a view illustrating an example of adjusting an amount of power supplied to a rechargeable battery.
Figure 10:
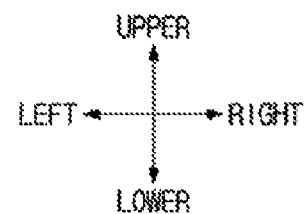

FIG. 10 is a view illustrating of an example of adjusting an amount of power supplied to a rechargeable battery.

In some forms, the expected amount of charge 249 of the rechargeable battery 130 is 100%, the terminal apparatus 200 may be set to input the command to reduce the power distribution rate of the rechargeable battery 130 but set to be unable to input the command to increase the power distribution rate of the rechargeable battery 130. This is because, there may be no need of distributing higher power to the rechargeable battery 130 since the rechargeable battery 130 is fully charged during the charge request period. In this case, a user may move the image 242 indicating the power distribution rate of the rechargeable battery 130 to a left side 245, but may not move the image 242 indicating the power distribution rate of the rechargeable battery 130 to a right side 246.

Figure 11:
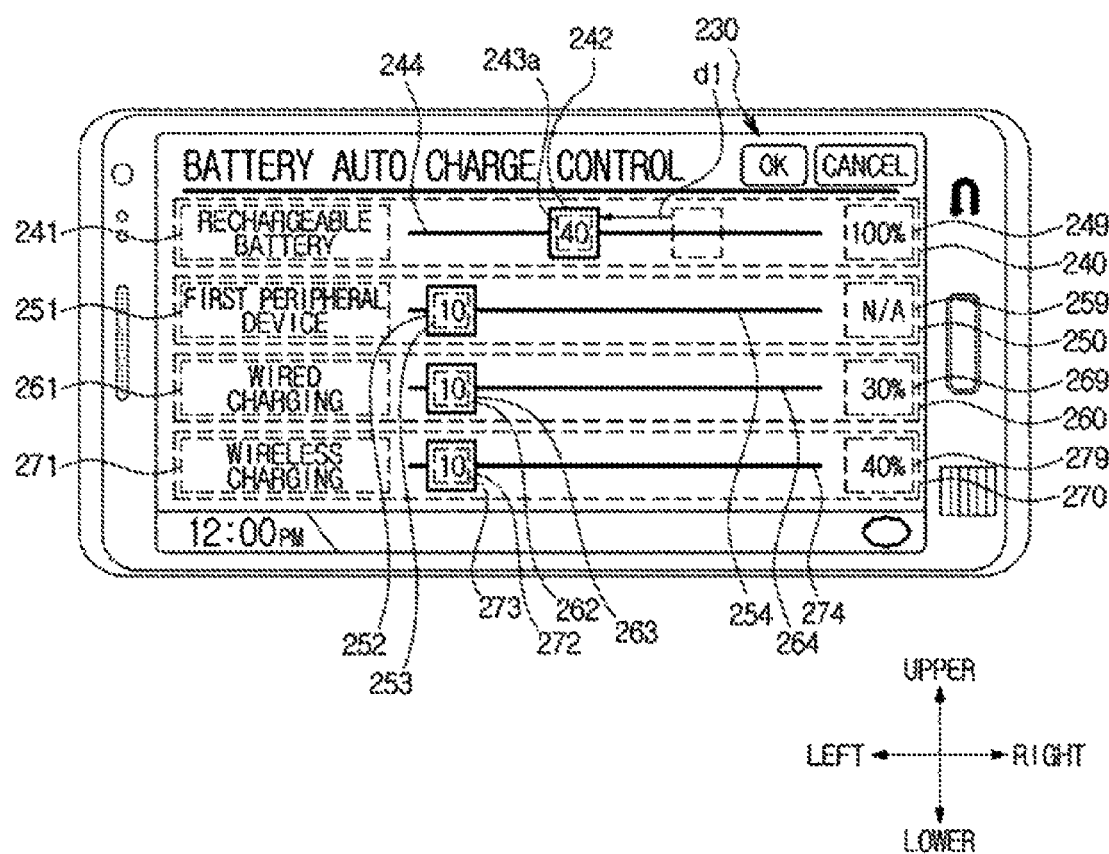
FIG. 11 is a view illustrating an example of reducing an amount of power supplied to a rechargeable battery.
Figure 12:
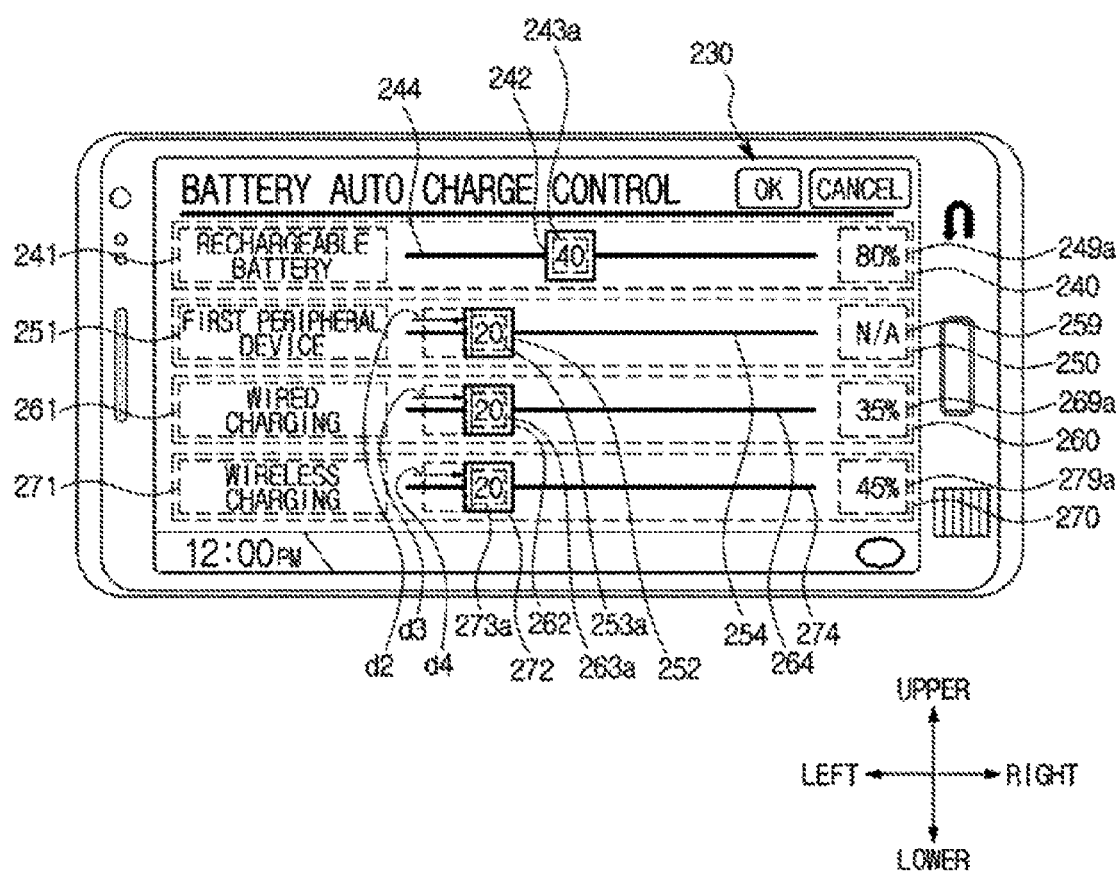
FIG. 12 is a first view illustrating an example in which an amount of power supplied to another component is automatically adjusted when adjusting an amount of power supplied to a rechargeable battery.
Figure 13:
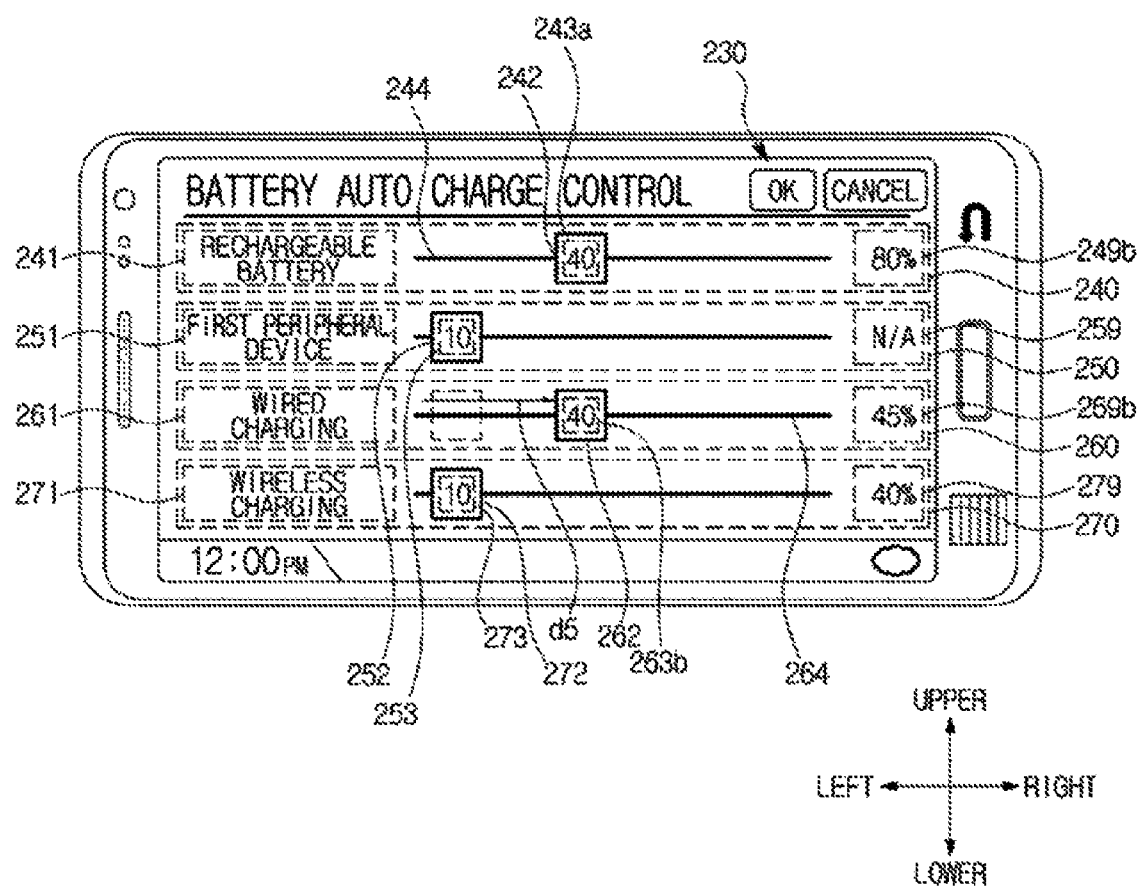
FIG. 13 is a second view illustrating an example in which an amount of power supplied to another component is automatically adjusted when adjusting an amount of power supplied to a rechargeable battery.

FIG. 11 is a view illustrating an example of reducing an amount of power supplied to a rechargeable battery, FIG. 12 is a first view illustrating an example in which an amount of power supplied to another component is automatically adjusted when adjusting an amount of power supplied to a rechargeable battery, and FIG. 13 is a second view illustrating an example in which an amount of power supplied to another component is automatically adjusted when adjusting an amount of power supplied to a rechargeable battery.

When a user moves the image 242 indicating the power distribution rate of the rechargeable battery 130 to a left direction (d1) through a touch gesture or an operation of a mouse device, the command to reduce the power distribution rate of the rechargeable battery 130 may be input. In this case, the size of the reduction of the power distribution rate of the rechargeable battery 130 may be proportional to the movement distance of the image 242. The expected amount of charge may be changed according to the reduction of the power distribution rate of the rechargeable battery 130. As illustrated in FIGS. 12 and 13, an expected amount of charge 249*a* and 249*b* may be reduced according to the reduction of the power distribution rate of the rechargeable battery 130.

Meanwhile, the power distribution rate of the rechargeable battery 130 may be reduced from 70% (243) to 40% (243*a*). According to the reduction of the power distribution rate of the rechargeable battery 130, a sum of a distribution rate of power distributed to the rechargeable battery 130 and a distribution rate of power distributed to all of the peripheral device 140 may be smaller than 100%.

In this case, in some forms, the terminal apparatus 200 may automatically change the power distribution rate of the peripheral device so that a sum of the distribution rate of power distributed to the rechargeable battery 130 and the distribution rate of power distributed to all of the peripheral device 140 becomes 100%. According to another embodiment, a user may manually change the power distribution rate of the peripheral device so that a sum of the distribution rate of power distributed to the rechargeable battery 130 and the distribution rate of power distributed to all of the peripheral device 140 becomes 100%.

Referring to FIG. 12, In some forms, when a sum of the distribution rate of power distributed to the rechargeable battery 130 and the distribution rate of power distributed to all of the peripheral device 140 is smaller than 100% since the power distribution rate of the rechargeable battery 130 is reduced, the controller 203 of the terminal apparatus 200 may increase the power distribution rate of each of the peripheral device by the same ratio. For example, the controller 203 may adjust the power distribution rate of the peripheral device by increasing the power distribution rate of each of the peripheral device by 10%. In this case, in some forms, in order to inform a user whether the power distribution rate is changed or not, the controller 203 may control the image 252, 262, and 272 indicating the power distribution rate of each of the peripheral device so that the image 252, 262, and 272 may be moved to the right direction (d2 to d4) and displayed. The image 252, 262, and 272 indicating the power distribution rate of each of the peripheral device may be moved along the above-mentioned guide 254, 264, and 274. In addition, the controller 203 may change a number 253*a*, 263*a*, and 273*a* indicating a distribution rate of power and display the changed number. For example, when the power distribution rate of each of the peripheral device is equally increased by 10%, the controller 203 may allow the number 253*a*, 263*a*, and 273*a* indicating a distribution rate of power to be changed from 10 to 20 and to be displayed.

Referring to FIG. 13, in other forms, the controller 203 of the terminal apparatus 200 may change the power distribution rate of each of the peripheral device 140 by differently increasing the power distribution rate of each of the peripheral device 140 by using a variety of information when a sum of the distribution rate of power distributed to the rechargeable battery 130 and the distribution rate of power distributed to all of the peripheral device 140 is smaller than 100% since the power distribution rate of the rechargeable battery 130 is reduced. The variety of information may be a weighted value that is individually set in each of the peripheral device. For example, when the first peripheral device and the wireless charger 160 has a weight value that is set to 0 (zero) and the display apparatus for vehicle 170 has a weight value that is set to a certain value, the controller 203 may increase the power distribution rate of the display apparatus for vehicle 170 up to 40% while maintaining the power distribution rate of the wireless charger 160 as 10%. In the same way, in order to inform a user whether the power distribution rate is changed or not, the controller 203 may control the display 206 and/or the touch screen 208 so that the display 206 and/or the touch screen 208 may display changed power distribution rate by using the image 252, 262, and 272 and/or the number 253*a*, 263*a*, and 273*a*. For example, the controller 203 may move the image 262 corresponding to the power distribution rate of the wired charger 150 whose power distribution rate is increased up to 40% to the right direction (d5) and/or change the number 263*a* indicating the power distribution rate of the wired charger 150 into 40% and display the changed number.

Figure 14:
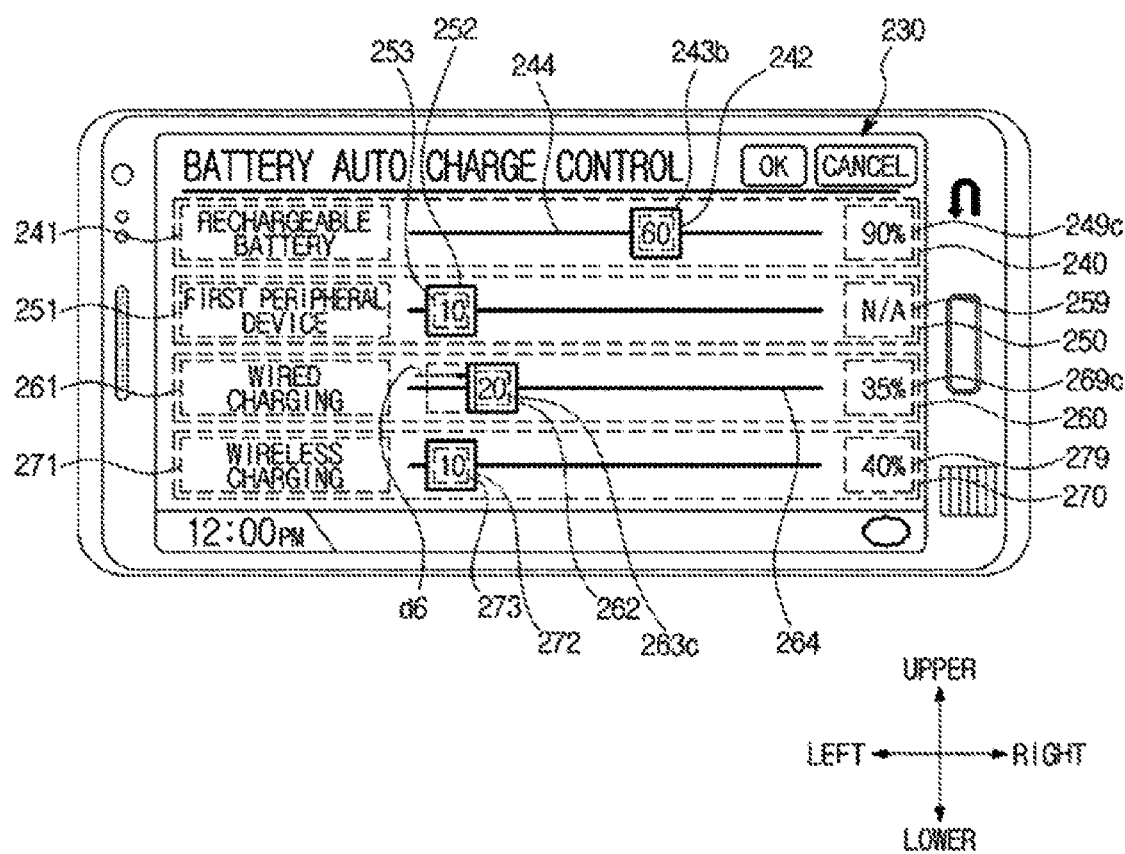
FIG. 14 is a first view illustrating an example of adjusting an amount of power supplied to another component other than a rechargeable battery.
Figure 15:
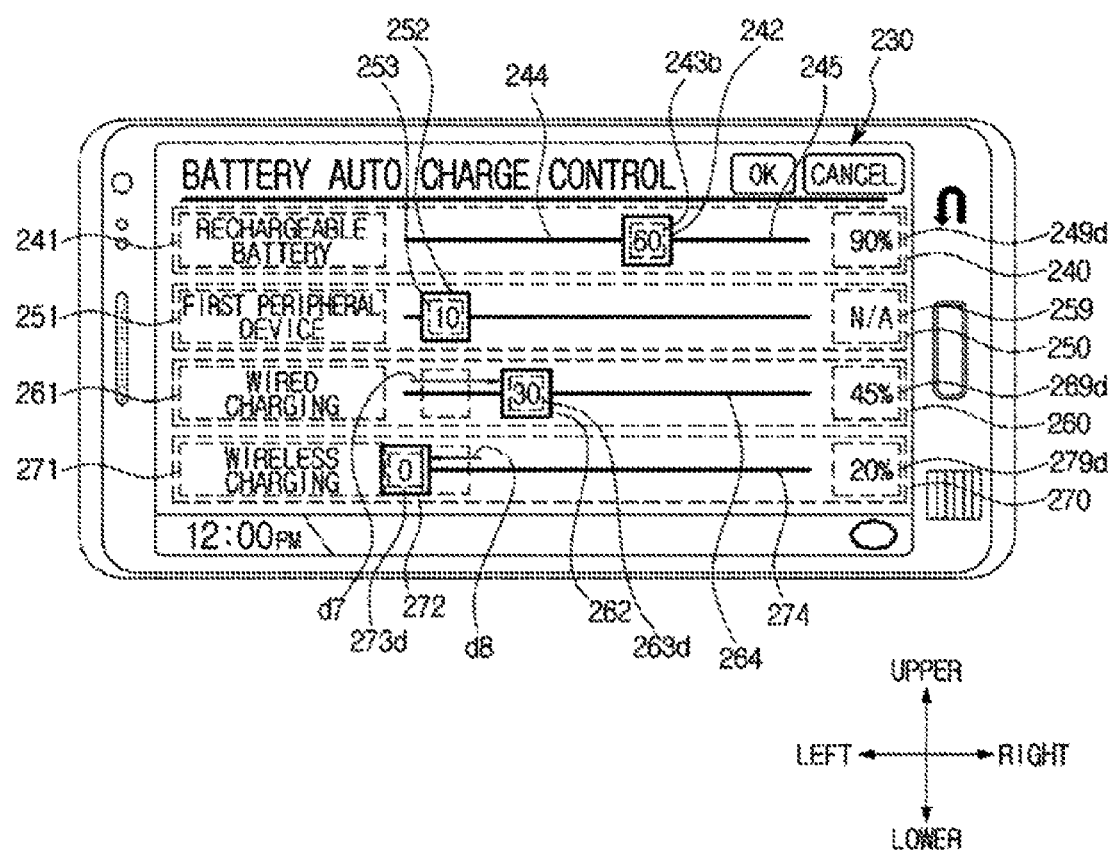
FIG. 15 is a second view illustrating an example of adjusting an amount of power supplied to another component other than a rechargeable battery.

FIG. 14 is a first view illustrating of an example of adjusting an amount of power supplied to another component other than a rechargeable battery, and FIG. 15 is a second view illustrating of an example of adjusting an amount of power supplied to another component other than a rechargeable battery.

As illustrated in FIGS. 14 and 15, when the power distribution rate of the rechargeable battery 130 is reduced from 70% (243) to 60% (243*b*) by a user's operation, the user may manually adjust the power distribution rate of at least one of the peripheral device among the plurality of the peripheral device 140 so that the sum of the distribution rate of power distributed to the rechargeable battery 130 and the distribution rate of power distributed to all of the peripheral device 140 becomes 100%.

Particularly, as illustrated in FIG. 14, a command to increase the power distribution rate of at least one peripheral device, e.g., the wired charger 150 from 10% (263) to 20%

(263c) may be input. In this case, a user may input a command to increase the power distribution rate of the wired charger 150 by moving the 262 indicating the power distribution rate of the wired charger 150 to a right direction (d6) along the guide 264 via a touch operation on the touch screen 208 or via an operation of the input unit 207. In this case, the number (263c) indicating the power distribution rate of the wired charger 150 may be changed to a value corresponding to a moving distance of the image 262, e.g., 20 by the operation of the controller 203. In the same way, a command to increase the power distribution rate of the first peripheral device or a command to increase the power distribution rate of the wireless charger 160 may be input by a user's operation. In addition, in the same way, all of a command to increase the power distribution rate of the first peripheral device, a command to increase the power distribution rate of the wireless charger 160, and a command to increase the power distribution rate of the wired charger 150 may be input by a user's operation.

In addition, as illustrated in FIG. 15, for another example, a user may input a command to increase the power distribution rate of at least one peripheral device, e.g., the wired charger 150 and a command to reduce the power distribution rate of another peripheral device, e.g., the wireless charger 160. Particularly, for example, a user may input a command to reduce the power distribution rate of the wireless charger 160 and a command to increase the power distribution rate of the wired charger 150 by moving the image 272 indicating the power distribution rate of the wireless charger 160 to a left direction (d8) along the guide 264 and by moving the image 262 indicating the power distribution rate of the wired charger 150 to a right direction along the guide 264 via a touch operation on the touch screen 208 or via an operation of the input unit 207. In this case, since the power distribution rate of the wireless charger 160 is reduced, the power distribution rate of the wired charger 150 may be increased than as illustrated in FIG. 14. For example, as illustrated in FIG. 15, when the power distribution rate of the wireless charger 160 is reduced down to 0% (273d), the power distribution rate of the wired charger 150 may be increased up to 30% (223d).

Meanwhile, when the power distribution rate of the rechargeable battery 130 is reduced from 70% (243) to 60% (243b), an expected amount of charge (249d) of the rechargeable battery 130 may be also reduced, and an expected amount of charge (269c and 269d) of the terminal apparatus that is charged via the wired charger 150 may be increased according to the increase of the power distribution rate. Meanwhile, in contrast, an expected amount of charge (279d) of the terminal apparatus that is charged via the wireless charger 160, in which a command to reduce of the power distribution rate is input may be reduced to correspond to the reduction of the power distribution rate.

Figure 16:
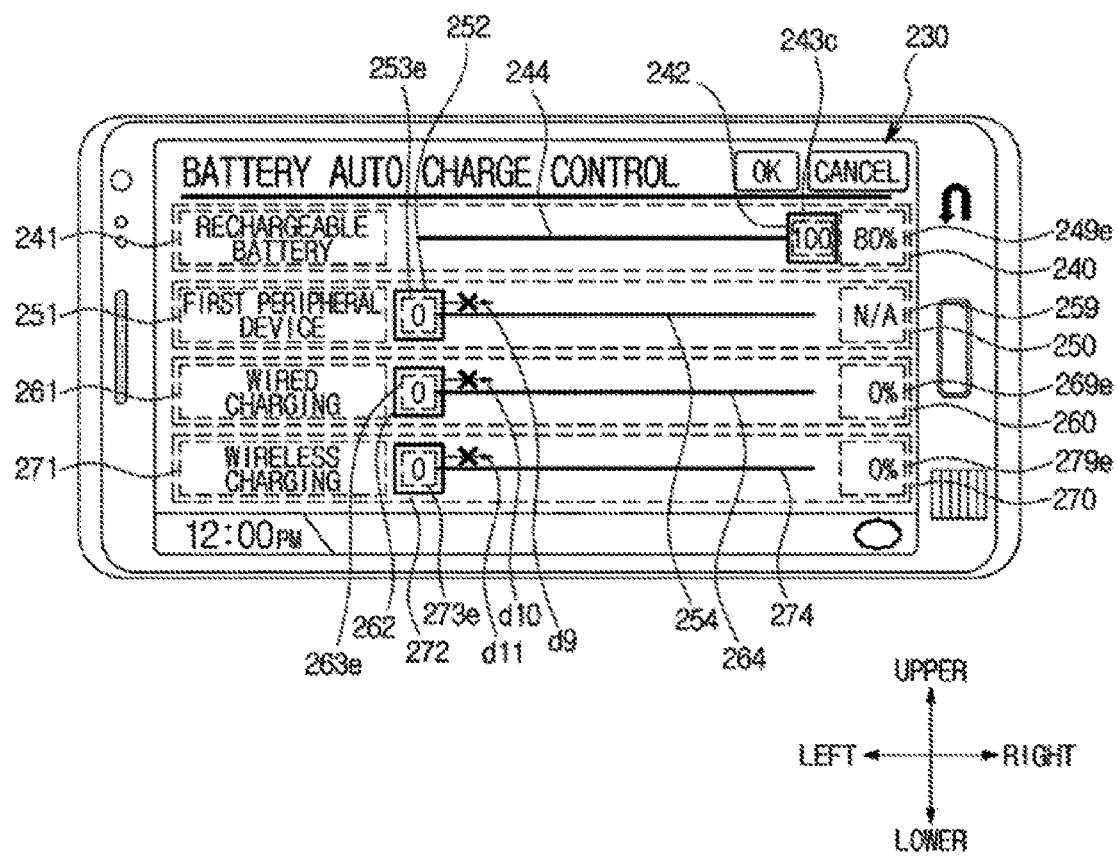
FIG. 16 is a third view illustrating an example of adjusting an amount of power supplied to another component other than a rechargeable battery.

FIG. 16 is a third view illustrating an example of adjusting an amount of power supplied to another component other than a rechargeable battery.

As illustrated in FIG. 16, it may be determined that the rechargeable battery 130 is not fully charged during a charge request period although all of the power supplied from the external power source 91 is supplied to the rechargeable battery 130. For example, it may be determined that the rechargeable battery 130 is charged up to 80% (249e) by the supplied power during the charge request period. In this case, the controller 203 may determine a power distribution rate so that all of the power supplied from the external power source 91 is supplied to the rechargeable battery 130. In other words, a power distribution rate of the rechargeable battery 130 may be set to 100% (243c) and a power distribution rate of each of the peripheral device 140 may be set to 0% (253e, 263e, and 273e).

In this case, the power distribution rate of each of the peripheral device 140 may be set to be not increased until a user reduces the power distribution rate of the rechargeable battery 130. For example, as illustrated in FIG. 16, an image 252, 262 and 272 indicating the power distribution rate of the peripheral device 140 may be set to be not moved to the right direction (d9 to d11) despite of a user' operation. Because of this, when the command to increase the power distribution rate of the peripheral device 140 is input since the image 252, 262 and 272 indicating the power distribution rate of the peripheral device 140 is moved to the right side, the sum of the distribution rate of power distributed to the rechargeable battery 130 and the distribution rate of power distributed to all of the peripheral device 140 may exceed 100%. When a user inputs the command to reduce the power distribution rate of the rechargeable battery 130 by moving the image 242 corresponding to the power distribution rate of the rechargeable battery 130 to the left side, the command to increase the power distribution rate of the peripheral device 140 may be input within a range of the reduction of the power distribution rate input by a user.

As mentioned above, a power distribution rate determined by the controller 203 of the terminal apparatus 200 may be adjustable according to a user's operation and/or a setting of the controller 203, and the adjusted power distribution rate may be transmitted to the charge controller 123 of the vehicle 100. The charge controller 123 may distribute the power and supply the distributed power to at least one of the rechargeable battery 130 and the peripheral device 140 according to the adjusted power distribution rate.

Hereinbefore an example in which a power distribution rate is adjusted by the controller 203 of the terminal apparatus 200 is described, but the adjustment of the power distribution rate may be not performed by the controller 203 of the terminal apparatus 200. The adjustment of the power distribution rate may be performed by at least one of the controller 120 of the vehicle 100, the controller 173 of the display apparatus for vehicle 170, and the controller 98 of the server device 99.

As mentioned above, the rechargeable battery 130 may be charged according to a mode selected by a user, e.g., the rechargeable battery charge exclusive mode and the plurality of devices charge mode. The rechargeable battery 130 may be fully charged when a certain period of time is passed after the power is supplied to the rechargeable battery 130.

Figure 17:
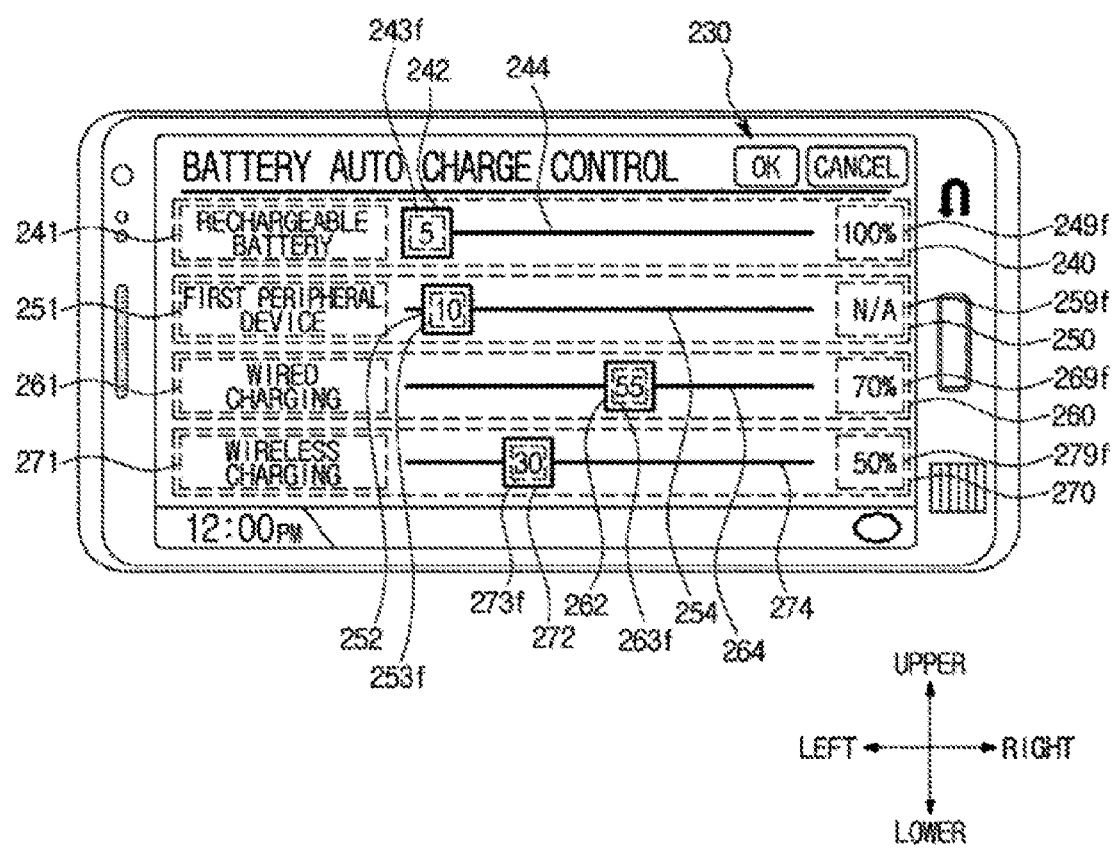
FIG. 17 is a view illustrating an example of a screen displayed on a terminal apparatus when charging is completed and operation is performed according to a plurality of devices charge mode.

FIG. 17 is a view illustrating an example of a screen displayed on a terminal apparatus when charging is completed and operation is performed according to a plurality of devices charge mode.

When charging of the rechargeable battery 130 is completed according to the rechargeable battery charge exclusive mode, the plurality of devices charge mode is performed, or charging of the rechargeable battery 130 is completed according to the plurality of devices charge mode, the user interface 205 of the terminal apparatus 200 may display a screen as illustrated in FIG. 17 to allow a user to adjust a power distribution rate again, in some forms.

Particularly, since the rechargeable battery 130 is fully charged, the power distribution rate of the rechargeable battery 130 may be set to allow only minimal power maintaining the full charge state of the rechargeable battery 130 to be supplied. For example, the power distribution rate of the rechargeable battery 130 may be set to 5% (243f) and the image 242 indicating a power distribution rate of the rechargeable battery 130 may be placed in a position corresponding to the power distribution rate, i.e., the image 242 is placed on the left side of the screen.

A power distribution rate of another peripheral device, e.g., the first peripheral device, the wired charger 150 and the wireless charger 160 may be set according to a pre-determined setting prior to a user's operation. A power distribution rate of each of the peripheral device may be set to the same value, or may be set to a different value, according to a power consumption of the device or a weighted value that is defined by a designer or a user. For example, a power distribution rate of the first peripheral device may be set to 10% (253*f*), a power distribution rate of the wired charger 150 may be set to 55%, and a power distribution rate of the wireless charger 160 may be set to 30%.

As mentioned above, when a power distribution rate that is newly set is displayed after the rechargeable battery 130 is fully charged, a user may adjust the power distribution rate of the rechargeable battery 130 and the peripheral device 140 that is newly set, again, according to the above-mentioned method. For example, the user may input a command to increase the power distribution rate of the rechargeable battery 130 by moving the image 242 indicating the power distribution rate of the rechargeable battery 130 to the right side, or may input a command to increase or a command to reduce the power distribution rate of the peripheral device 140 by moving the image 252, 262, and 272 indicating the power distribution rate of the peripheral device 140 to the right side or the left side.

As mentioned above, when a power distribution rate is newly set or adjusted, the charge controller 123 may supply the power to at least one of the rechargeable battery 130 and the peripheral device 140 according to the newly set or the adjusted power distribution rate.

Accordingly, it may be possible to fully charge the rechargeable battery 130 and to properly distribute the power to each of the peripheral device 140 needing the power.

Hereinafter a control method of a vehicle in accordance with an embodiment of the present disclosure will be described with reference to FIGS. 18 and 19.

Figure 18:
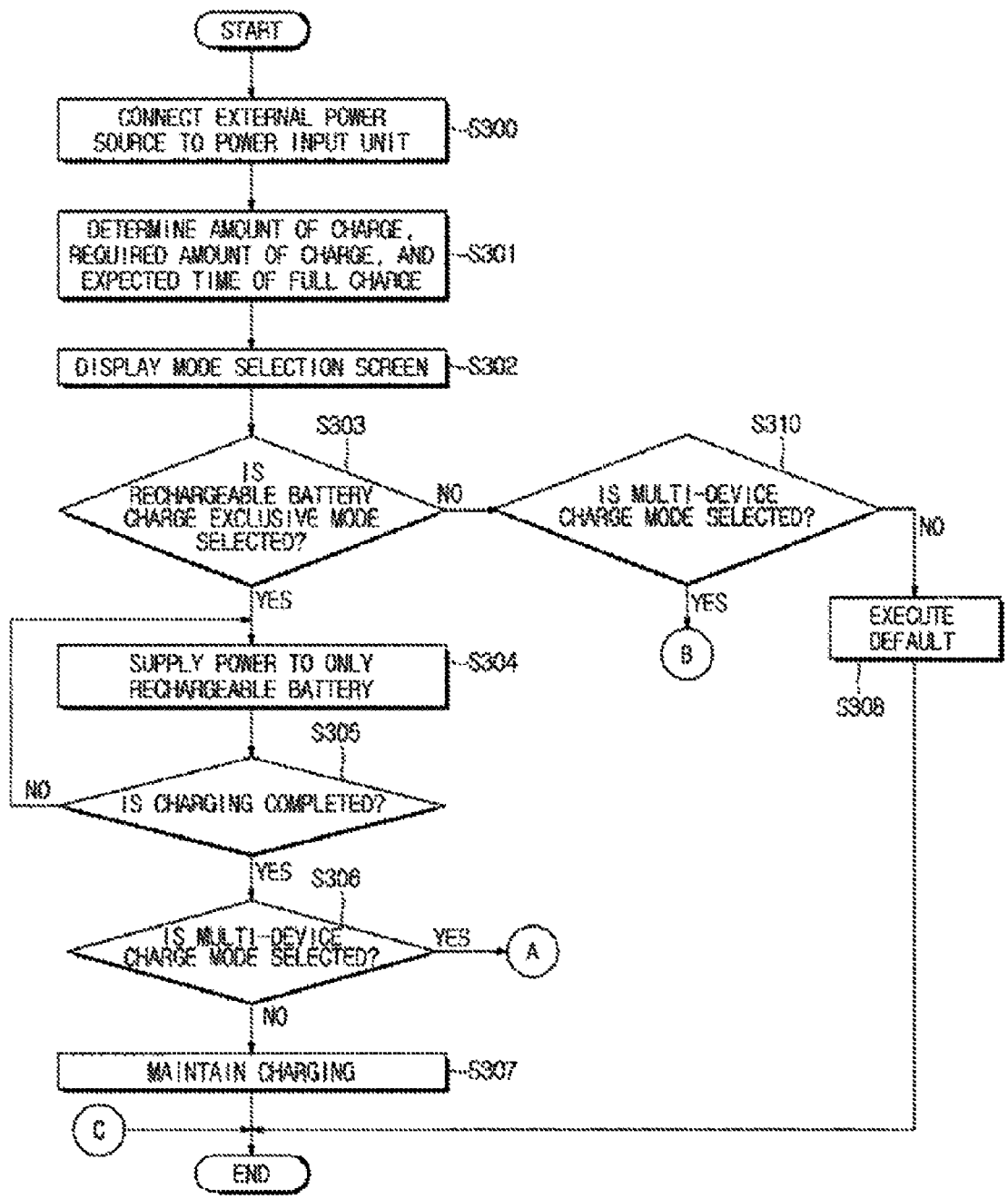
FIG. 18 is a first flow chart of a control method of a vehicle.
Figure 19:
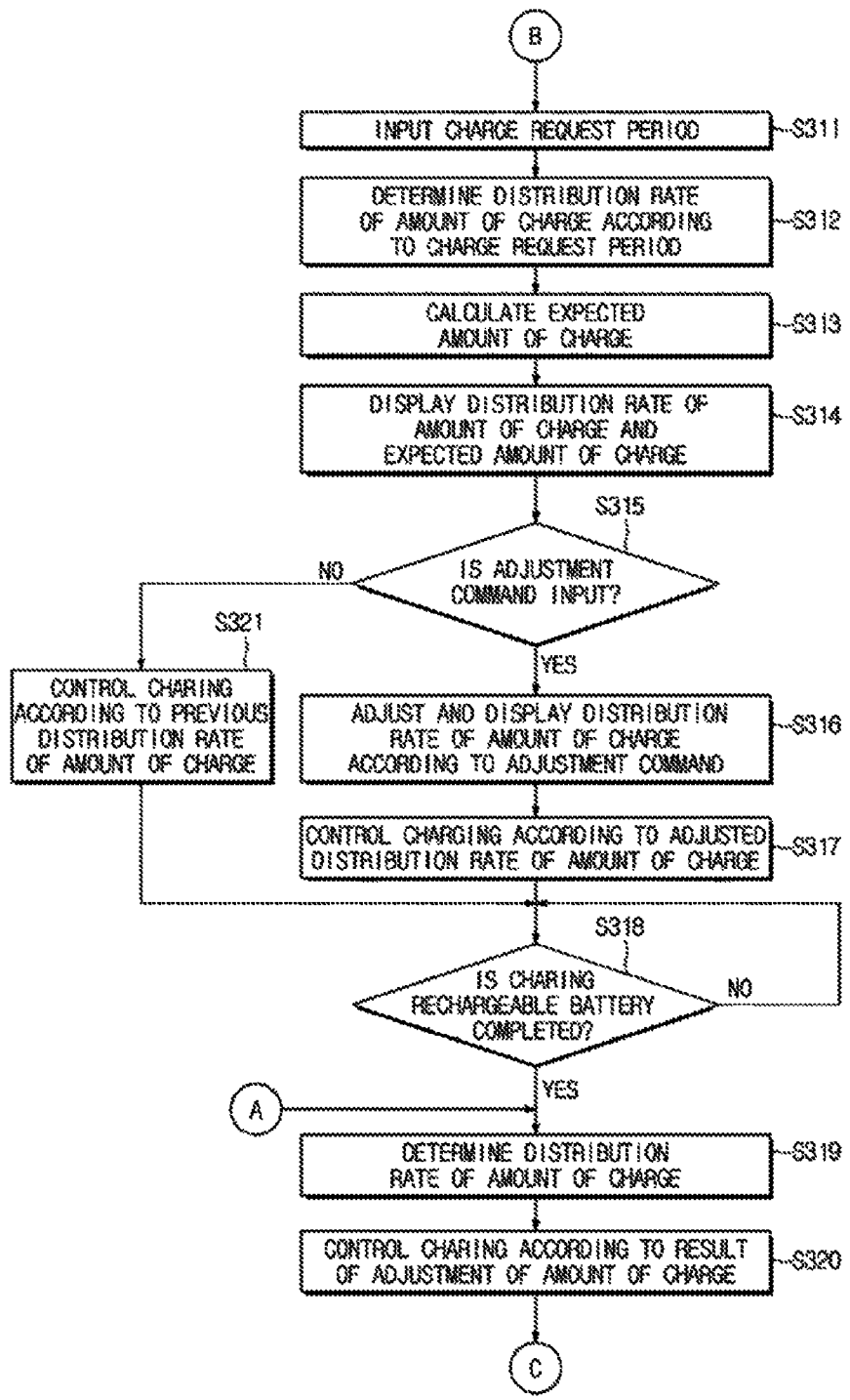
FIG. 19 is a second flow chart of a control method of a vehicle.

FIG. 18 is a first flow chart of a control method of a vehicle, and FIG. 19 is a second flow chart of a control method of a vehicle in accordance with an embodiment of the present disclosure.

In some forms of a control method of a vehicle as illustrated in FIGS. 18 and 19, the power input unit of the vehicle may be electrically connected to an external power source, wherein the vehicle may be an electric vehicle. Since the power input unit of the vehicle is electrically connected to the external power source, the power may be supplied to the vehicle, and thus charging of the vehicle may be started or the vehicle may become a rechargeable state (S 300). In this case, the charge of the vehicle may be started or the vehicle may become a rechargeable state such that the terminal of the power input unit of the vehicle may be coupled to a terminal that is formed in an end of a cable that is to supply an external power source.

When the vehicle is electrically connected to the external power source, at least one of a current amount of charge, an amount of charge for a full charge, and an expected time for a full charge of the rechargeable battery of the current vehicle may be determined (S 301). The current amount of charge may be obtained from the rechargeable battery, and the amount of charge for a full charge may be obtained by calculating a difference between the current amount of charge and the capacity of the rechargeable battery. In addition, the expected time for a full charge may be calculated by using an amount of power, a current amount or the size of current, which is additionally required for a full charge.

The determination of at least one of the current amount of charge, the amount of charge for a full charge, and the expected time for a full charge may be performed by at least one of a controller in the vehicle, a controller of the display for the vehicle that is communicatively connected to the vehicle via CAN communication system, a controller of a server device that is separately provided and configured to be communicable with the vehicle, and a controller of a terminal apparatus configured to communicable with at least one of the vehicle and/or the server device.

A mode selection screen may be displayed (S 302). In the mode selection screen, a plurality of modes configured to be selected may be displayed, and a tool e.g., a plurality of selection buttons that is to select any one among the plurality of modes may be further displayed as needed. In some forms, the plurality of selectable modes may be displayed together with at least one of the determined current amount of charge, amount of charge for a full charge, and expected time for a full charge. The selectable mode may include a rechargeable battery charge exclusive mode and a plurality of devices charge mode. The mode selection screen may be displayed through at least one of the user interface of the display apparatus for vehicle and the user interface of the terminal apparatus.

A user may select any one of the selectable modes, e.g., the rechargeable battery charge exclusive mode and the plurality of devices charge mode by using at least one of the user interface of the display apparatus for vehicle and the user interface of the terminal apparatus (S 303).

When a user selects the rechargeable battery charge exclusive mode (YES of S 303), all of the power supplied to the vehicle may be transmitted to the rechargeable battery so as to be used to charge the rechargeable battery (S 304). That is, the power supplied from the external power source may be transmitted to only the rechargeable battery while the power is not supplied to other peripheral device in the vehicle, e.g., the air conditioning device, the wired charger or the wireless charger. Accordingly, the rechargeable battery of the vehicle may be more rapidly charged. The supply of the power to the rechargeable battery may be performed until the charge of the rechargeable battery is completed (NO of S 305).

When the charge of the rechargeable battery is completed (YES of S 305), the plurality of devices charge mode may be selected by a user's operation or a pre-determined setting (S 306). In some forms, a user may select the rechargeable battery charge exclusive mode (YES of S 303) and then may further select whether to execute the plurality of devices charge mode after the charge is completed. In a state in which the charge is completed, when the user determines to execute the plurality of devices charge mode and input a selection command related thereto, the plurality of devices charge mode may be executed (YES of S 306). In other forms, a user may additionally input an execution command of the plurality of devices charge mode via the user interface after the charge is completed (YES of S 305), and when the user inputs the execution command of the plurality of devices charge mode, the plurality of devices charge mode may be executed (YES of S 306).

When the plurality of devices charge mode is executed (YES of S 306) after the charge is completed, a distribution rate of power that is supplied from the external power source to the vehicle may be determined (S 319), and the power may be supplied to at least one of the rechargeable battery and the peripheral device according to the distribution rate (S 320). The distribution rate of the power may be determined after being adjusted according to a user's adjustment command. In addition, the distribution rate of the power may be automatically adjusted and determined according to a pre-determined setting, and in this case, the power distribution rate may be determined to allow minimal power to be supplied to maintain the full charge state of the rechargeable battery while a remaining power is distributed and supplied to the peripheral device. When distributing the power to the plurality of the peripheral devices, a power distribution rate may be determined according to the power consumption of each of the peripheral device, or a weighted value that is defined by a designer or a user. In addition, the power distribution rate may be determined to have the same value. Accordingly, a proper power may be distributed and supplied to the peripheral device.

In contrast, when the plurality of devices charge mode is pre-set to be unexecuted or a user does not input the command to execute the plurality of devices charge mode after selecting the rechargeable battery charge exclusive mode and/or after the charge is completed (NO of S 306), the vehicle may be operated to maintain a previous state thereof. For example, supplying the power to the rechargeable battery may be maintained without stopping (S 307).

When the plurality of devices charge mode is selected instead of the rechargeable battery charge exclusive mode after the mode select screen is displayed (NO of S 303 and YES of S 310), a message asking to input a charge request period may be firstly displayed as illustrated in FIG. 19, and a user may input the charge request period in response to the message (S 311). For example, the charge request period may represent a period until a user uses the vehicle from when the charge of the vehicle is started.

When the charge request period is input, a power distribution rate may be determined according to the charge request period (S 312). In this case, the power distribution rate may be determined in the priority in the charge of the rechargeable battery. Particularly, for example, a power distribution rate of the rechargeable battery may be firstly determined so that the rechargeable battery is fully charged during the charge request period, and then a power distribution rate of the peripheral device may be secondly determined. The power distribution rate of each peripheral device may be determined according to the power consumption of each peripheral device, or a weighted value that is defined by a designer or a user. In addition the power distribution rate may be determined to have the same value.

When it is determined that the rechargeable battery is not fully charged although the charging is performed during the charge request period, a power distribution rate may be determined to exclusively supply the power to the rechargeable battery. In other words, a power distribution rate may be determined as 100% so that the rechargeable battery is fully charged, and a power distribution rate of the peripheral device may be determined as 0%.

The determination of the power distribution rate may be performed by at least one of the controller of the vehicle, the controller of the display apparatus for vehicle, the controller of the server device and the controller of the terminal apparatus.

In addition, when the power distribution rate is determined and then the power is supplied according the power distribution rate, an expected amount of charge of a variety of rechargeable devices during the charge request period may be calculated (S 313). In some forms, the variety of rechargeable devices may include a rechargeable battery and further include a rechargeable battery of at least one of terminal apparatus connected to the wired charger and/or the wireless charger. The expected amount of charge may be calculated by using an amount of supplied power, a current amount of charge, and a charge request period. The calculation of the expected amount of charge may be performed by at least one of the controller of the vehicle, the controller of the display apparatus for vehicle, the controller of the server device and the controller of the terminal apparatus.

The power distribution rate and the expected amount of charge may be provided to a user in a visual manner (S 314). For example, the user interface of the display apparatus for vehicle and/or the user interface of the terminal apparatus may provide the power distribution rate and the expected amount of charge to a user by being displayed as illustrated in FIGS. 9 to 17. As needed, the power distribution rate and the expected amount of charge may be provided to a user in the form of voice.

When the power distribution rate and the expected amount of charge are provided, a user may adjust the determined power distribution rate by inputting the power distribution rate adjustment command (YES of S 315).

When a user inputs the power distribution rate adjustment command, the power distribution rate may be adjusted in response to the power distribution rate adjustment command, and the expected amount of charge may be re-calculated in response to the power distribution rate adjustment command (S 316). The power distribution rate adjustment command may be input by the above-mentioned method in FIGS. 9 to 17.

For example, the power distribution rate adjustment command may include an increase command and/or a reduction command of at least one of the power distribution rate of the rechargeable battery and the power distribution rate of the peripheral device, and the power distribution rate may be adjusted by reducing and/or increasing of the power distribution rate of each device in response to the increase command and/or the reduction command.

For another example, when it may be needed to correct the determined power distribution rate, a power distribution rate of part of devices may be firstly reduced and then a power distribution rate of another part of devices may be increased. Particularly, for example, the power distribution rate of the rechargeable battery may be firstly reduced and then the increase command to increase the power distribution rate of at least one of the peripheral device may be input. In this case, as needed, the reduction command of the power distribution rate of part of the peripheral device may be input.

In a state in which the power distribution rate of the rechargeable battery is determined, when a user inputs the reduction command of the power distribution rate of the rechargeable battery, the power distribution rate of another peripheral device may be automatically increased in response to the reduction of the power distribution rate of the rechargeable battery or may be manually increased or reduced according to a user's operation. When the power distribution rate of another peripheral device is automatically increased, the power distribution rate of each peripheral device may be equally or differently increased. When the power distribution rate of the peripheral device is differently increased, the power distribution rate of each peripheral device may be differently increased according to a power consumption of the device or a weighted value that is defined by a designer or a user.

The adjusted power distribution rate and the re-calculated expected amount of charge may be provided to a user in a visual and/or acoustic manner through the user interface of the display apparatus for vehicle and/or the user interface of the terminal apparatus. The adjustment of the power distribution rate and/or the re-calculation of the expected amount of charge may be performed by at least one of the controller of the vehicle, the controller of the display apparatus for vehicle, the controller of the server device and the controller of the terminal apparatus.

When the power distribution rate is adjusted and confirmed, the charge controller of the vehicle may distribute the power according to the adjusted power distribution rate to allow the distributed power to be supplied to the rechargeable battery and the peripheral devices (S 317). When the adjustment of the power distribution rate and/or the re-calculation of the expected amount of charge is performed by at least one of the controller of the display apparatus for vehicle, the controller of the server device and the controller of the terminal apparatus, the vehicle charge controller may receive the adjusted power distribution rate via the communicator of the vehicle, and then control the supply of the power to the rechargeable battery and the peripheral devices according to the adjusted power distribution rate received.

When a user does not input the power distribution rate adjustment command (NO of S 315), the charge controller of the vehicle may distribute the power according to the previously determined power distribution rate to allow the distributed power to be supplied to the rechargeable battery and the peripheral devices (S 321). A case in which a user does not input the power distribution rate adjustment command may include a case in which a certain time is expired after a screen to input the power distribution rate adjustment command is displayed, and/or a case in which an exit command of the power distribution rate adjustment command is input When the power is distributed and supplied to the rechargeable battery according to the previous power distribution rate or the adjusted power distribution rate and then the charge of the rechargeable battery is completed (YES of S 318), the power distribution rate may be determined again (S 319). In this case, the power distribution rate may be determined to allow a minimal power to be supplied to maintain the full charge state of the rechargeable battery while a remaining power is distributed and supplied to the peripheral device. In this case, the determination of the power distribution rate may be determined by being adjusted according to user's new adjustment command or may be automatically determined according to a pre-determined setting by a user and/or a designer. When distributing the power to the plurality of the peripheral devices, a power distribution rate may be determined according to the power consumption of each of the peripheral device, or a weighted value that is defined by a designer or a user. In some forms, the power distribution rate may be determined to allow the same power to be supplied to each of the peripheral device.

When the power distribution rate is re-determined, the charge controller of the vehicle may distribute the power according to the re-determined power distribution rate and supply the disturbed power to at least one of the rechargeable battery and the peripheral devices (S 320).

As illustrated in FIG. 18, when both of the rechargeable battery charge exclusive mode and the plurality of devices charge mode are not selected after the mode selection screen is displayed (NO of 310), the vehicle, the display apparatus for vehicle and/or the terminal apparatus may be set to be operated according to a predetermined default value. For example, in some forms, when any mode is not selected until a certain time is expired, at least one of the controller of the vehicle, the controller of the display apparatus for vehicle, the controller of the server device and the controller of the terminal apparatus may automatically determine that the rechargeable battery charge exclusive mode is selected, and transmit a result of the determination to the vehicle charge controller in a direct or indirect manner. The charge controller of the vehicle may allow the power to be exclusively supplied to the rechargeable battery according to the result of the determination. In another form, when both of the rechargeable battery charge exclusive mode and the plurality of devices charge mode are not selected, at least one of the controller of the vehicle, the controller of the display apparatus for vehicle, the controller of the server device and the controller of the terminal apparatus may automatically determine that the control method of the vehicle is terminated. In this case, the display apparatus for vehicle and/or the terminal apparatus may automatically terminate the mode selection screen after a certain time is expired and then may display another screen that is additionally set.

A control method of the vehicle according the above-described form may be implemented in the form of a program executed by a variety of computer means. The program may include program instructions, data files, and data structures as itself or a combination therewith. The program may be designed or manufactured by using higher level code executed by the computer by using an interpreter, as well as by using a machine code that is produced by a compiler. In addition, the program may be particularly designed to implement the control method of the above mentioned image acquisition apparatus or may be implemented by using various functions or definition that are well-known and available to a group of ordinary skill in the computer software field.

Programs for implementing the control method of the above-mentioned vehicle may be recorded on a recording medium readable by a computer. The recording medium readable by a computer may include various types of hardware devices capable of storing a particular program executed in response to a call from a computer, e.g., magnetic disk storage media such as a hard disk or a floppy disk, optical media such as a magnetic tape, a compact disc (CD) or a DVD, magneto-optical media such as a floptical disk, and semiconductor memory devices such as ROM, RAM, or flash memory.

Hereinbefore a variety of forms of the vehicle, the vehicle control system, the display apparatus, the terminal apparatus and the control method of the vehicle are described, but is not limited thereto. A variety of forms which is implementable by those skilled in the art by correcting and modifying based on the above mentioned form may correspond to the above mentioned vehicle, vehicle control system, display apparatus, terminal apparatus and control method of the vehicle. For example, when the above-mentioned techniques is executed in a different order from the above-mentioned method, and/or the above-mentioned components such as system, structure, device and circuit is coupled or combined in a manner different from the above-mentioned method or is replaced or substituted by other components or equivalents, the same or the similar result as the above-mentioned vehicle, vehicle control system, display apparatus, terminal apparatus and control method of the vehicle may be achieved and those may correspond to an example of the above-mentioned vehicle, vehicle control system, display apparatus, terminal apparatus and control method of the vehicle.

As is apparent from the above description, according to the proposed vehicle, vehicle control system, display apparatus for vehicle, terminal apparatus and control method of the vehicle, a user may easily, quickly and conveniently adjust the charge of the rechargeable battery of the vehicle.

In addition, the charge efficiency may be improved since the power distribution rate of the rechargeable battery and the variety of peripheral devices during a user's desired charge request period may be automatically distributed or manually distributed according to a user's operation.

When a reserved charging of the vehicle is performed by using a midnight electricity for household or the charge is performed in a general electric vehicle charging station, a rate or a proportion of supplying the power to the rechargeable battery and each of peripheral devices may be easily adjusted according to the needs of the user.

Although a few forms of the present disclosure have been shown and described, it would be appreciated by those skilled in the art that changes may be made in these forms without departing from the principles and spirit of the disclosure, the scope of which is defined in the claims and their equivalents.

What is claimed is:

1. A vehicle control system comprising:
   a terminal apparatus configured to receive an input of a charge request period and to receive an adjustment command related to a power distribution rate determined by the charge request period; and
   a vehicle configured to distribute and supply a power, which is supplied externally from the vehicle, to at least one of an embedded rechargeable battery and at least one peripheral device, according to a power distribution rate of the embedded rechargeable battery that is adjusted based on the adjustment command.

2. The vehicle control system of claim 1, wherein at least one of the terminal apparatus and the vehicle determines the power distribution rate according to the charge request period.

3. The vehicle control system of claim 1, wherein the adjustment command comprises at least one of a reduction command and an increase command related to at least one of the power distribution rate of the embedded rechargeable battery and the power distribution rate of the at least one peripheral device.

4. The vehicle control system of claim 3, wherein the terminal apparatus is configured to receive at least one of a reduction command and an increase command related to the power distribution rate of the at least one peripheral device, after a reduction command related to the power distribution rate of the embedded rechargeable battery is input.

5. The vehicle control system of claim 4, wherein at least one of the terminal apparatus and the vehicle is configured to automatically increase a power distribution rate of the at least one peripheral device when the adjustment command relates to the power distribution rate is the reduction command related to the power distribution rate of the embedded rechargeable battery.

6. The vehicle control system of claim 5, wherein at least one of the terminal apparatus and the vehicle is configured to automatically increase a power distribution rate of each peripheral device of a plurality of peripheral devices of the at least one peripheral device by increasing a power distribution rate of each peripheral device of the plurality of peripheral devices equally, or by increasing a power distribution rate of each peripheral device of a plurality of peripheral devices of the at least one peripheral device based on a different weighted value, when the at least one peripheral device includes a plurality of peripheral devices.

7. The vehicle control system of claim 1, wherein at least one of the terminal apparatus and the vehicle is configured to determine the power distribution rate to allow the embedded rechargeable battery to be fully charged during the charge request period.

8. The vehicle control system of claim 1, wherein at least one of the terminal apparatus and the vehicle is configured to determine the power distribution rate to allow the power to be exclusively supplied to the embedded rechargeable battery when it is determined that the embedded rechargeable battery is not fully charged during the charge request period.

9. The vehicle control system of claim 1, wherein the terminal apparatus is configured to receive an input of an increase command of the power distribution rate of the at least one peripheral device, only when a reduction command of the power distribution rate of the embedded rechargeable battery is input.

10. The vehicle control system of claim 1, wherein at least one of the terminal apparatus and the vehicle is configured to calculate at least one of an expected amount of charge of the rechargeable battery and one peripheral device of the at least one peripheral device based on the power distribution rate.

11. The vehicle control system of claim 10, wherein the terminal apparatus is configured to receive an input of a reduction command related to the power distribution rate of the rechargeable battery when the expected amount of charge of the rechargeable battery is maximum.

12. The vehicle control system of claim 1, wherein the terminal apparatus is configured to receive an input of selecting any one of a rechargeable battery charge exclusive mode and a plurality of devices charge mode.

13. The vehicle control system of claim 12, wherein the vehicle is configured to supply the power to the embedded rechargeable battery exclusively when the rechargeable battery charge exclusive mode is selected.

14. The vehicle control system of claim 13, wherein the vehicle is configured to select the plurality of devices charge mode according to a pre-determined setting or a user's manipulation using the terminal apparatus when the embedded rechargeable battery is fully charged.

15. The vehicle control system of claim 12, wherein the terminal apparatus is configured to receive an input of a charge request period when the plurality of devices charge mode is selected.

16. The vehicle control system of claim 1, wherein the at least one peripheral device comprises at least one of a wireless charger and a wired charger.

17. The vehicle control system of claim 16 further comprising: a server device configured to calculate the power distribution rate according to the charge request period.

18. A terminal apparatus configured to be communicable with a vehicle, the terminal apparatus comprising:
   a user interface configured to display a power distribution rate of each of a rechargeable battery and at least one peripheral device that is determined based on a charge request period and configured to receive an input of an adjustment command related to the power distribution rate from a user; and
   a communicator configured to transmit the adjustment command or a power distribution rate that is adjusted based on the adjustment command to a vehicle.

19. The terminal apparatus according to claim 18, wherein the communicator is further configured to transmit the adjustment command or a power distribution rate that is adjusted based on the adjustment command to a controller of the vehicle, so that a power supplied to the vehicle to be distributed and supplied to at least one of the rechargeable battery and the at least one adjacent device of the vehicle.

20. A vehicle comprising:
a power input unit to which a power is input from a source external to the vehicle;
a rechargeable battery electrically connected to the power input unit;
at least one peripheral device electrically connected to at least one of the power input unit or the rechargeable battery; and
a controller configured to distribute and supply a power, which is input via the power input unit, to at least one of the rechargeable battery or the at least one peripheral device based on a first power distribution rate of the rechargeable battery and the at least one peripheral device that is determined based on a charge request period, or a second power distribution rate that is obtained by adjusting the first power distribution rate according to an adjustment command.

* * * * *